United States Patent
Ishimoto et al.

(10) Patent No.: US 7,912,821 B2
(45) Date of Patent: Mar. 22, 2011

(54) APPARATUS AND METHOD FOR DATA MANAGEMENT

(75) Inventors: Hiroaki Ishimoto, Kawasaki (JP); Jo Ajisawa, Kawasaki (JP); Naohiro Itou, Kawasaki (JP); Masashi Niwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 12/391,041

(22) Filed: Feb. 23, 2009

(65) Prior Publication Data

US 2009/0292706 A1 Nov. 26, 2009

(30) Foreign Application Priority Data

May 22, 2008 (JP) ................. 2008-134031

(51) Int. Cl.
*G06F 17/00* (2006.01)
(52) U.S. Cl. ........................ 707/704; 707/703
(58) Field of Classification Search .................. 707/607, 707/624, 625, 661–669, 687–694, 703, 704; 705/44, 59; 725/93
See application file for complete search history.

(56) References Cited

U.S. PATENT DOCUMENTS

| | | | |
|---|---|---|---|
| 7,243,088 B2 | 7/2007 | Verma et al. | 707/695 |
| 7,689,607 B2 * | 3/2010 | Oks et al. | 707/704 |
| 7,778,985 B2 * | 8/2010 | Scholtz | 707/703 |
| 2005/0209876 A1 * | 9/2005 | Kennis et al. | 705/1 |
| 2008/0155616 A1 * | 6/2008 | Logan et al. | 725/93 |
| 2008/0155686 A1 * | 6/2008 | McNair | 726/21 |

FOREIGN PATENT DOCUMENTS

JP A 2007-501468 1/2007

OTHER PUBLICATIONS

An online document: "PostgreSQL: Documentation: Manuals: PostgreSQI, 7.1: Multi-version Concurrency," searched on Apr. 25, 2008: http://www.postgresql.org/docs/7.1/static/mvcc.html.

* cited by examiner

*Primary Examiner* — Wilson Lee
(74) *Attorney, Agent, or Firm* — Greer, Burns & Crain, Ltd.

(57) ABSTRACT

A data management method includes a reference activation step, after generating a first time-series data for causing chronological relationship to be identifiable in a memory device at activation of a reference operation to a first record in a database, of referring to the first record; an update step, in response to an update request for the first record, of generating a second record corresponding to the first record in the database and updating the second record; a commit step of generating a second time-series data in the memory device at a commit operation for the updating; a reference termination step of deleting the first time-series data at completion of the reference operation; and a deletion step, if the first time-series data generated earlier than the second time-series data is not present as a result of the commit step or the reference termination step, of deleting the first record.

15 Claims, 21 Drawing Sheets

NODE NUMBER:
DATA ID:
TIME-SERIES NUMBER:
ISSUANCE TIME TYPE:

APPARATUS AND METHOD FOR DATA MANAGEMENT

CROSS-REFERENCE TO RELATED APPLICATIONS

This application is based upon and claims the benefit of priority of the prior Japanese Patent Application No. 2008-134031, filed on May 22, 2008, the entire contents of which are incorporated herein by reference.

FIELD

The embodiments discussed herein are related to an apparatus and method for data management and a storage medium for storing programs for implementing the method.

BACKGROUND

In a conventional database, some techniques as presented below are used in multiple execution of transactions (such as reference operation or update operation) in order to guarantee integrity and consistency of data while ensuring simultaneous executability.

(1) Technique for control reference and update operations by locking database resources such as rows (2) Technique for managing the row in multiple versions and enabling reference to data before update during the update (3) Technique for managing the row in two or more versions and retiring unnecessary records In the technique (1), data consistency is ensured by applying share lock to a target resource in a reference operations and exclusive lock to a target resource in an update operation. For a share-locked resource, only a share lock is permitted and other operations are not permitted. For an exclusive-locked resource, any type of lock operation is locked. In this manner, presently referred and/or updated resources can be prevented from being updated, thereby ensuring the data consistency. However, since the reference operation and the update operation are serialized (lock suspension), there arises an object of improved concurrency (parallelism). In addition, as a result of locking of database resources, lock suspension may occur, which may make it difficult to design lock mechanisms in operation construction.

In the technique (2), multiple versions may be generated for each record. In other words, when a record is updated, a new version of the record is generated. In a reference operation, a referable version of the record is referred to. Accordingly, different versions of a target resource are applied in the reference operation and the update operation. As a result, lock suspension can be suppressed in the reference operation and the update operation. However, since it is not identified when an earlier version of data should be discarded, the earlier version of data cannot be discarded, which may lead to an increase in data areas.

In the technique (3), a record is managed in two versions plus something extra in order to enable a reference operation and an update operation to be performed concurrently, and a reference counter is attached to each of the versions of the record. Specifically, the reference counter for a target physical record is incremented by one at access to the physical record after start of a reference operation whereas the reference counter is decremented by one at completion of the reference operation. Then, it is determined which earlier version of the record (earlier record) has not been referred to and can be deleted based on the reference counter, that is, which earlier version of the record has the reference counter equal to 0, and the determined version of the record is deleted to suppress the increase in data areas. In a fixed number of versions, however, if a number of versions more than the fixed number of versions are generated, the earliest version would be deleted. In this case, there arises a risk that no operation with the earliest version can be performed. Thus, if there is a referred earlier record, that is, an earlier record with the reference counter equal to one or more, at completion of an update transaction, a fake deletion called "delayed deletion" is performed. In the delayed deletion, a flag called a deletion bit attached to a physical record is set to indicate that a fake deletion has been performed. The delayed deletion may disable the associated earlier record to be accessed except for reference operations for referring to that earlier record. After all the reference operations are completed, that is, after the reference counter reaches 0, the record subjected to the delayed deletion is deleted. See Japanese Laid-open Patent Publication No. 2007-501468 and an online document "Postgresql Documentation Manuals PostgreSQL 7.1 Multi-VersionConcurrency Control", searched on Apr. 25, 2008, over the URL "http://www.postgresql.org/docs/7.1/static/mvcc.html".

In the technique (3), however, a reference counter is attached to a physical record and updated for each reference. As a result, whenever the reference counter is updated, an I/O (Input/Output) operation may occur for rewriting in a database, which may reduce the speed of the reference operation.

In addition, if a DBMS (DataBase Management System) fails, the reference counter and/or others written in physical records must be modified at recovery, for example, resetting of the reference counter for all records to zero. If such modification is not made, the reference counter is not reset to zero after recovery and thus unnecessary records may remain. As a result, some input/output (I/O) operations to/from CPU, memories, secondary storages and/or others may occur.

Furthermore, in the technique (3), once an earlier referable version of record becomes unnecessary after completion of updating, the unnecessary version of record is retired and cleaned up through reference operations by resetting the reference counter to zero. As a result, the reference operations is made slower.

Still furthermore, in the technique (3) in addition to the normal two versions, a version is used for disabling access for operations other than a presently conducted reference operation in delayed deletion. For this reason, when capacity of database resources is designed, capacity for the delayed deletion must be taken into account. For example, if a certain presently referred record is updated twice, capacity for three versions of record, that is, the earliest version of record in delayed deletion, a referable version of record and a presently updated version of record, must be reserved during the second update. Since it is difficult to comprehend in advance when and/or how much the delayed deletion will be conducted, it may be hard to estimate the capacity of database resources.

SUMMARY

According to an aspect of embodiments described herein, there is provided a computer readable storage medium for storing a data management program causing a computer to execute a processing procedure, the processing procedure including: a reference activation procedure, after generating a first time-series data in a memory device at activation of a reference operation to a first record in a database, of referring to the first record, the first time-series data for causing chronological relationship to be identifiable; an update procedure, in response to an update request for the first record, of generating a second record corresponding to the first record in the database and updating the second record; a commit procedure of generating a second time-series data in the memory device at a commit operation for the updating; a reference termination procedure of deleting the first time-series data at completion of the reference operation; and a deletion procedure, if the first time-series data generated earlier than the second time-series data is not present as a result of the commit procedure or the reference termination procedure, of deleting the first record.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an exemplary arrangement of issuance data;

DESCRIPTION OF EMBODIMENTS

Preferred embodiments of the present invention will be explained with reference to the accompanying drawings.

Figure 1:
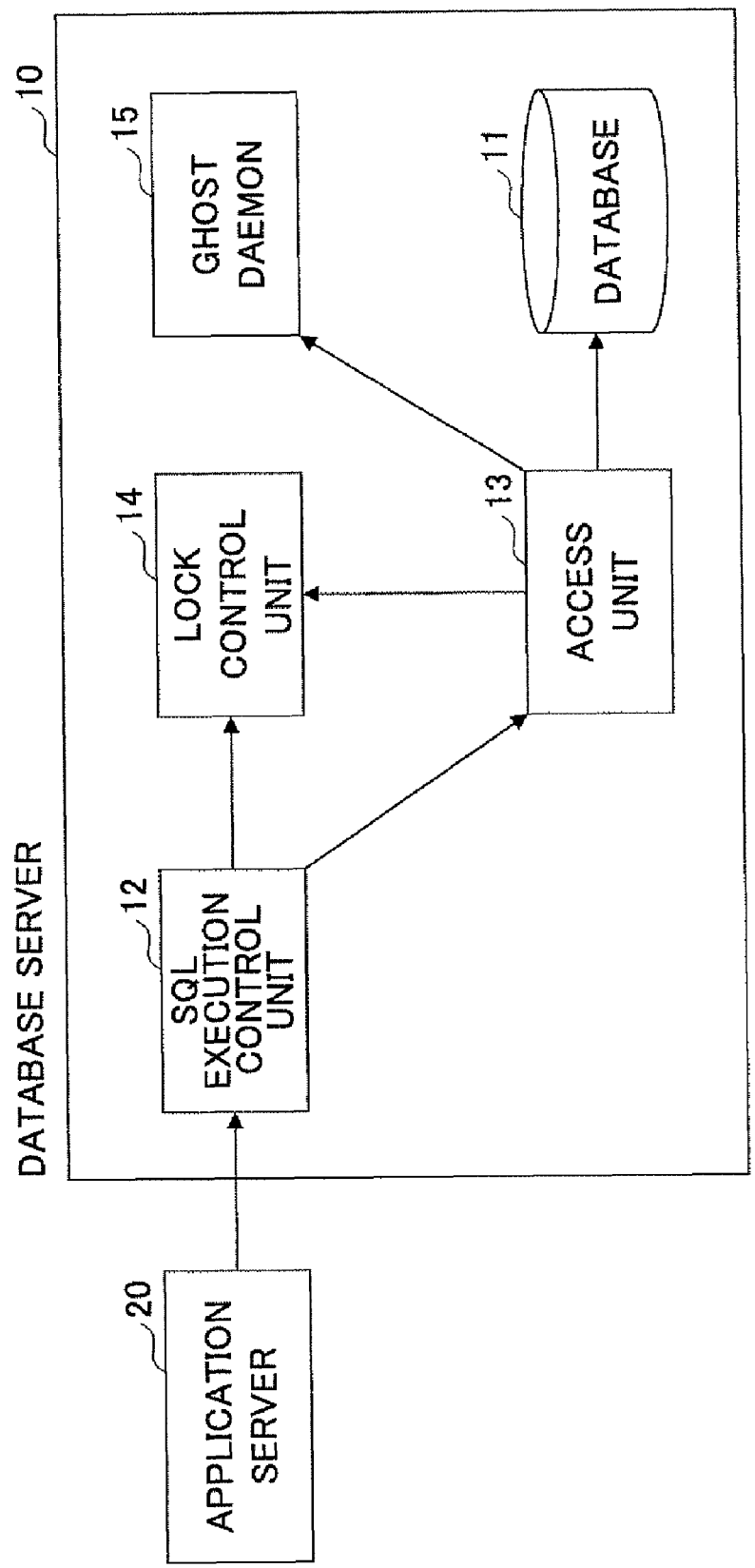
FIG. 1 illustrates an exemplary configuration of a data management system according to a first embodiment.

FIG. 1 illustrates an exemplary configuration of a data management system according to a first embodiment. In this illustration, the data management system includes a database server 10 and an application server 20. The database server 10 and the application server 20 are coupled to each other via a (wired or wireless) network such as a LAN (Local Area Network) or the Internet.

The database server 10 may be implemented as a computer with a database and an access means (manipulation means) for accessing the database and include a database 11, a SQL execution control unit 12, an access unit 13, a lock control unit 14 and a ghost daemon 15.

The database 11 consists of a collection of data (information) systematically stored in a storage device. In this embodiment, the database 11 may be an RDB (Relational DataBase) in which data items are managed in a tabular form. The SQL execution control unit 12 receives manipulation instructions on the database 11 in SQL (Structured Query Language) and controls operations corresponding to the manipulation operations. The access control unit 13 performs manipulations (update, reference, deletion and others) on the database 11 in response to instructions from the SQL execution control unit 12. The lock control unit 14 ensures data consistency under lock control in manipulations on the database 11. The ghost daemon 15 may consist of a daemon process for management of ghost transactions. The ghost transaction means a transaction transitioned (or initiated) in cases of an update transaction or a delete transaction meets a predefined condition. The ghost transaction inherits (keeps) occupation (lock) information on a source transaction. Thus, if the source transaction is transitioned to the ghost transaction, data to be manipulated remains locked even after completion of the source transaction. Herein, such a predefined condition may relate to presence of other transactions in which the same data as data to be manipulated in a commit operation for the relevant transaction is referred to.

The application server 20 may transmit manipulation instructions on the database 11 in SQL to the database server 10 depending on instructions supplied from users, for example.

Figure 2:
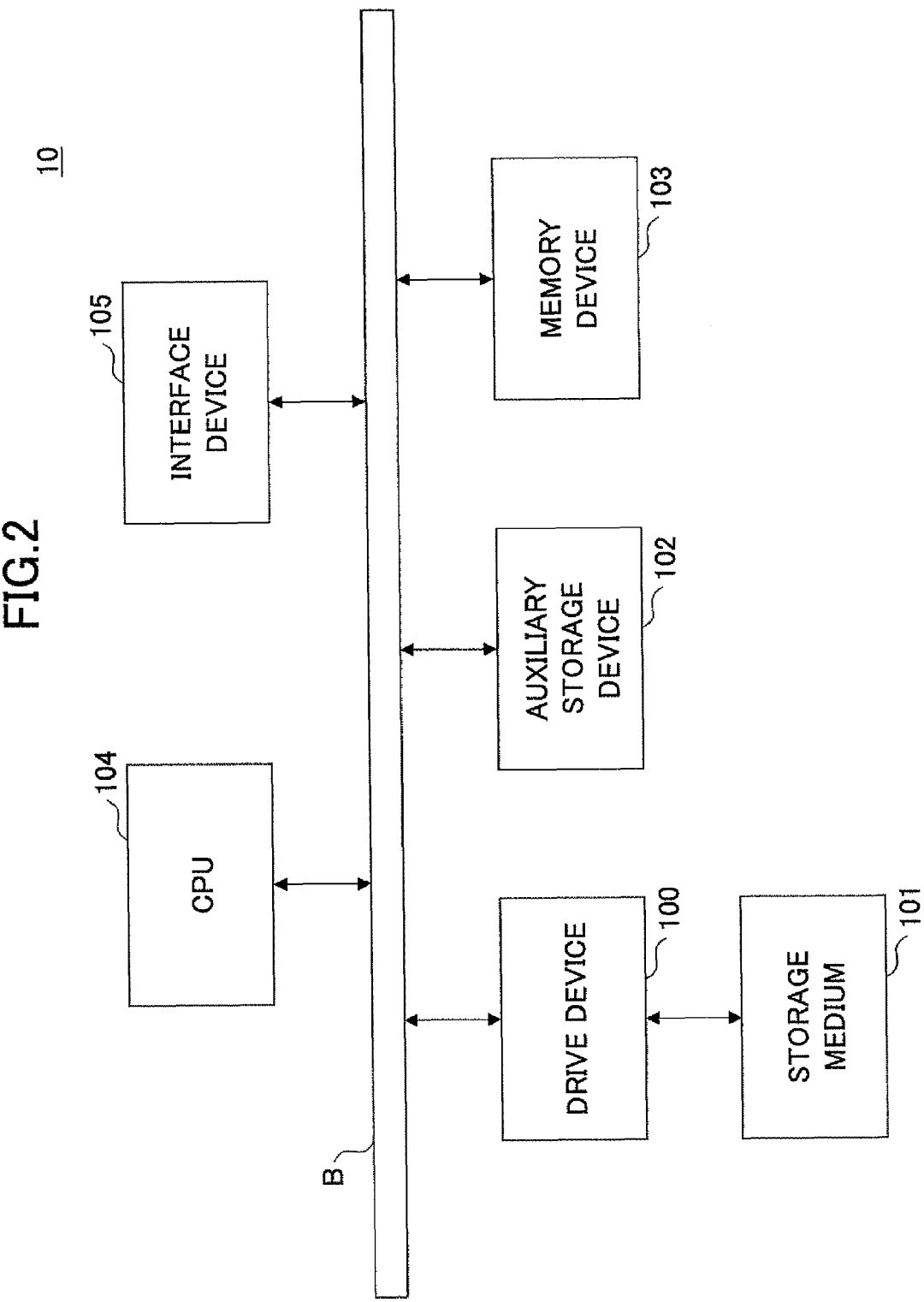
FIG. 2 illustrates an exemplary hardware configuration of a database server according to one embodiment.

FIG. 2 illustrates an exemplary hardware configuration of a database server according to one embodiment. In this illustration, the database server 10 includes a drive device 100, an auxiliary storage device 102, a memory device 103, a CPU (Central Processing Unit) 104 and an interface device 105, all of which are coupled to each other via a bus B.

Programs for implementing operations of the database server 10 may be supplied from a storage medium 101 such as CD-ROM (Compact Disk-Read Only Memory). When the storage medium 101 with recorded programs is set in the drive device 100, the programs are installed from the storage medium 101 to the auxiliary storage device 102 via the drive device 100. The auxiliary storage device 102 may store the installed programs as well as the database 11.

When it is instructed to activate a program, the memory device 103 reads and stores the program from the auxiliary storage device 102. The CPU 104 performs functions associated with the database server 10 in accordance with the program stored in the memory device 103. The interface device 105 serves as an interface to a network.

Figure 3:
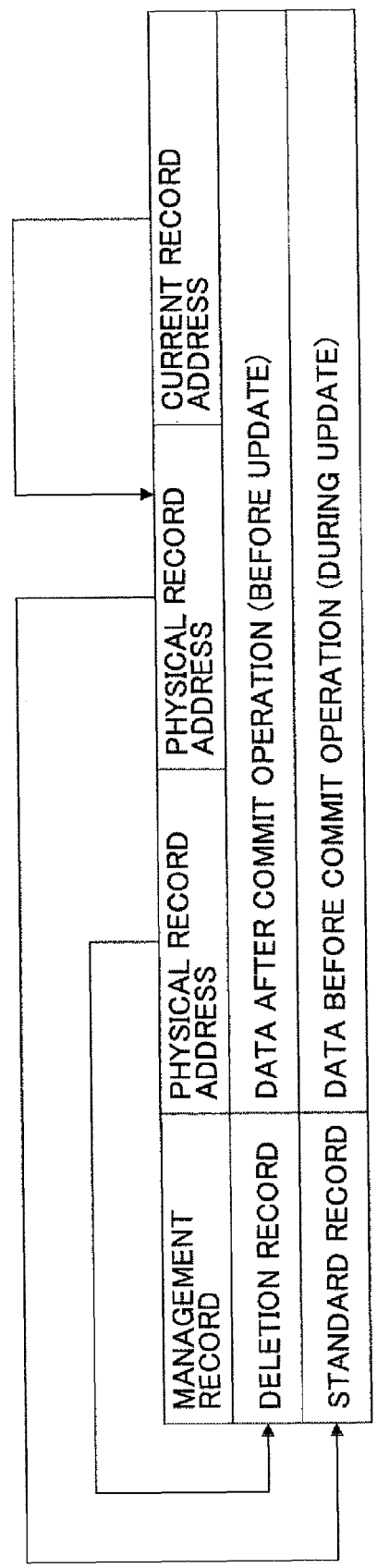
FIG. 3 illustrates an exemplary data structure of a database according to one embodiment.

Next, a data structure of the database 11 is described. FIG. 3 illustrates an exemplary data structure of the database 11 according to one embodiment. In this embodiment, the term "data" used herein means data base resources corresponding to a single row (logical row) in a logical table.

As illustrated in FIG. 3, a single data piece may include a management record, a deletion record and a standard record as physical records. The deletion record may be a record temporarily generated in an update operation or a deletion operation, and the associated data is referred to during an update operation or a deletion operation. The generation of deletion records ensures simultaneous executability of an update operation or a deletion operation and a reference operation. The standard record may be a permanent record as long as the associated data is not deleted and is updated in an update operation. Also, if the deletion record is present, it can be said that the standard record may be a new version of the deletion record. The management record may include two physical record addresses and a current record address. One of the two physical record addresses may be address information for the deletion record (physical location information in the database 11). The other physical record address may be address information for the standard record. The current record address may serve as location information on an area in which address information for a latest version of record (current record) is stored. Note that the management record is permanent as long as data is present. In other words, the management record and the standard record are permanently present while the deletion record is generated in an update operation.

Figure 4:
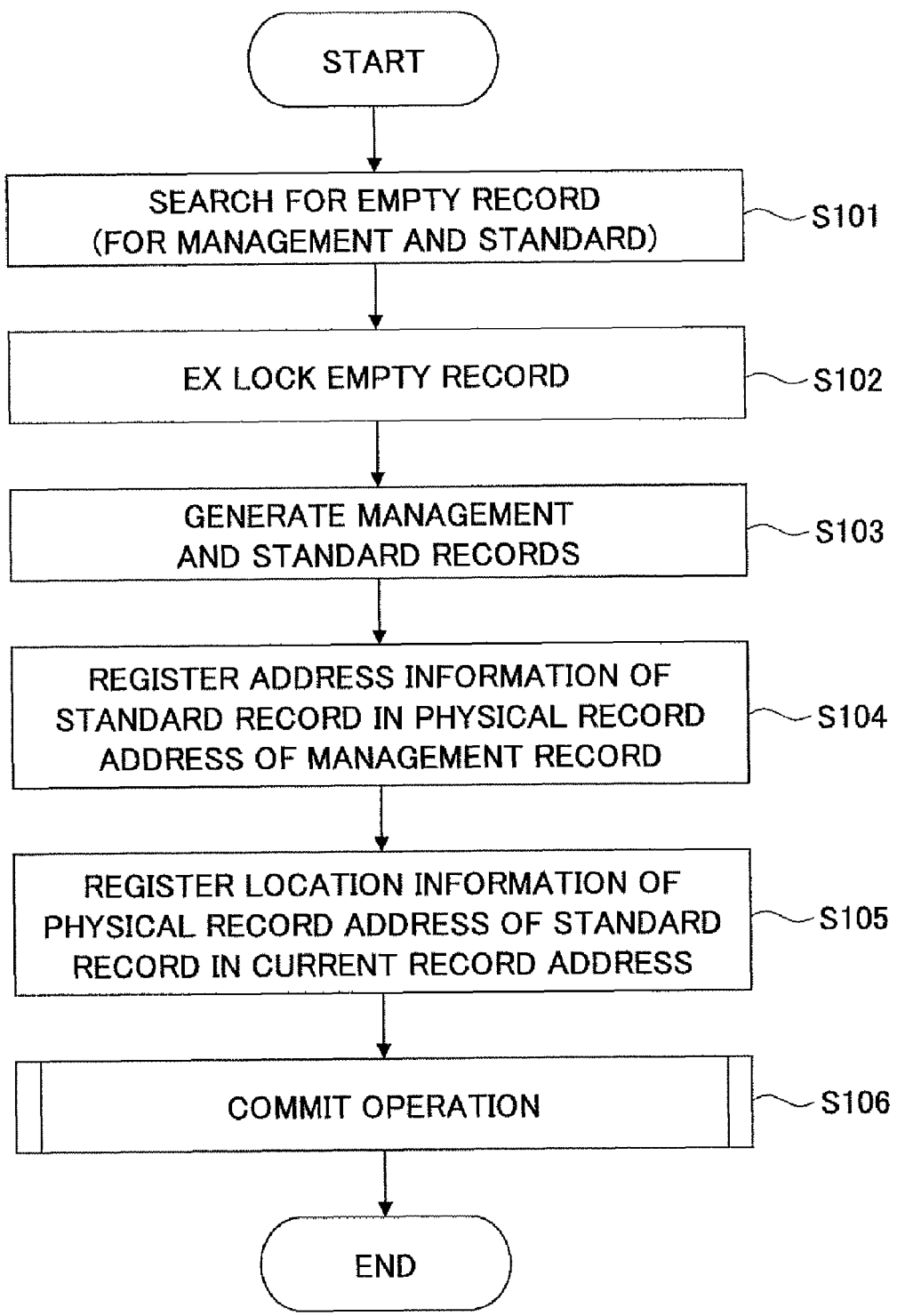
FIG. 4 is a flowchart illustrating an exemplary processing procedure of an insert transaction.

Next, a processing procedure of the database server 10 is described. FIG. 4 is a flowchart illustrating a processing procedure of an insert transaction.

In response to an instruction from the SQL execution control unit 12 that has received a data insertion instruction from the application server 20, at step S101, the access unit 13 searches the database 11 for an empty record (an empty area where a management record and a standard record can be generated) for data to be inserted (hereinafter referred to as "insertion data"). At step S102, the lock control unit 14 applies an exclusive lock to the detected empty record. In this embodiment, two types of exclusive lock exist: EX lock and SX lock. The EX lock to the management record may be a lock indicating that the associated data is presently modified (inserted, updated or deleted). Also, the SX lock to the management record may indicate that the associated data is not presently modified. On the other hand, the EX lock to the standard record or the deletion record may indicate that the associated data cannot be referred to except for a certain case (the case of reference initiated after a ghost transaction). Also, the SX lock to the standard record or the deletion record may indicate that the associated data can be referred to. Note that the EX lock and the SX lock do not have absolute meaning other than exclusive lock themselves. In other words, they only have relative meaning to differentiate between them. Thus, both of the locks have a uniform mechanism as exclusive locks. For example, it can be considered that an identifier may be attached to differentiate between the EX lock and the SX lock. Herein, the EX lock may be applied to the management record to insert the associated data. Also, presently inserted data cannot be referred to, and thus the EX lock may be applied to the standard record.

At step S103, the access unit 13 generates a management record and a standard record for the empty record. In the generation of the standard record, insertion data is registered in the standard record. At step S104, the access unit 13 registers address information of the standard record as a physical record address for the generated management record. In this embodiment, no deletion record is generated, and thus the other physical record address remains empty. At step S105, the access unit 13 registers location information of the physical record address associated with the standard record in a current record address of the management record. At step S106, a commit operation is performed. The commit operation will be described in detail below.

Figure 5:
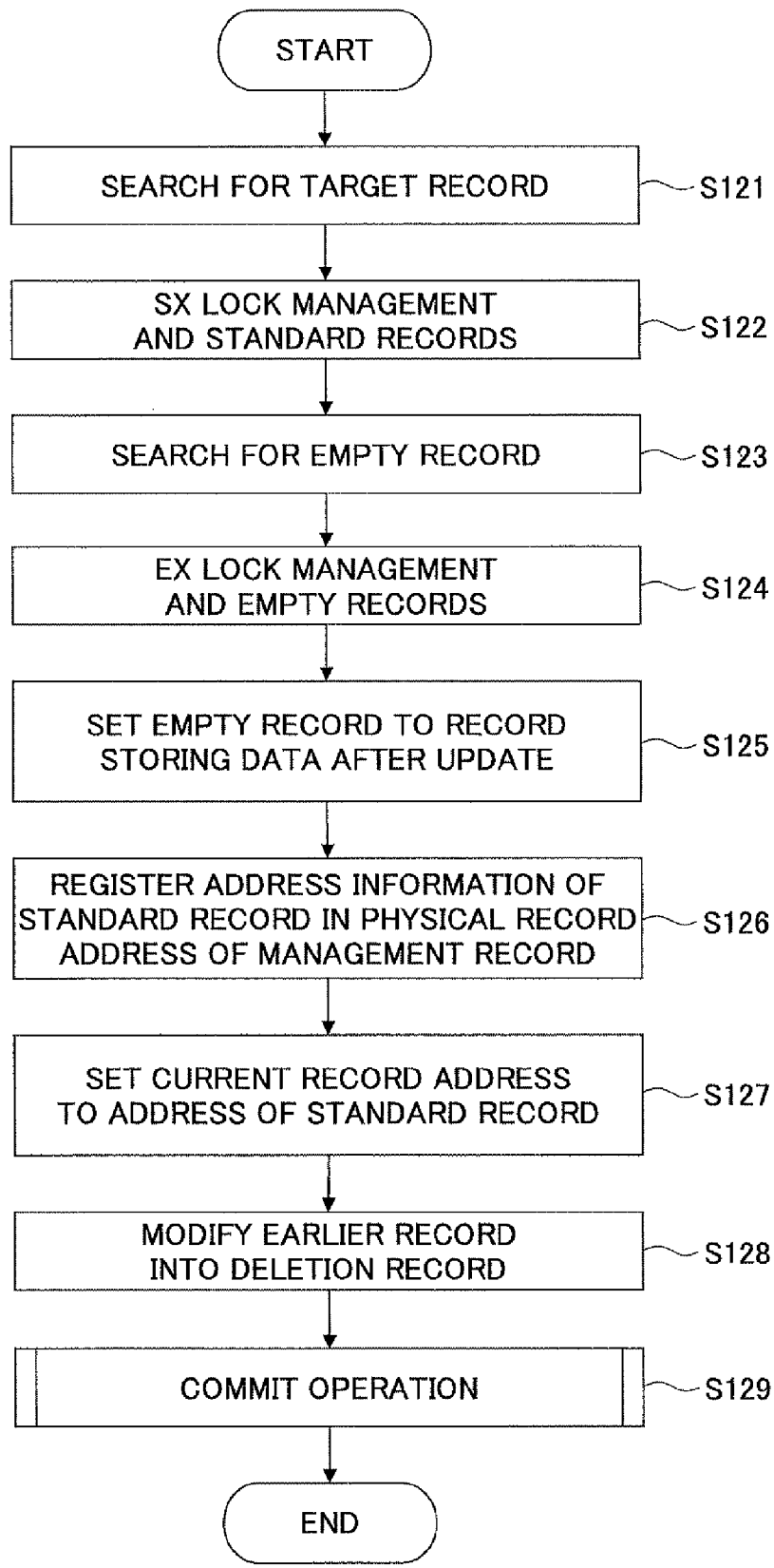
FIG. 5 is a flowchart illustrating an exemplary processing procedure of an update transaction.

Next, an update transaction is described. FIG. 5 is a flowchart illustrating an exemplary processing procedure of an update transaction.

In response to an instruction from the SQL execution control unit 12 that has received a data update instruction from the application server 20, at step S121, the access unit 13 searches the database 11 for a record (management record or standard record) associated with data to be updated (hereinafter referred to as "update data"). At step S122, the lock control unit 14 applies SX lock to the detected management record and standard record. At step S123, the access unit 13 searches the database 11 for an empty record (one number of record corresponding to the standard record) to register status of the standard record after updating. At step S124, the lock control unit 14 applies EX lock to the detected empty record and the management record associated with the update data in order to activate an update operation.

At step S125, the access unit 13 registers an update result for the standard record before updating in the empty record. Accordingly, at this time point, the status before updating must be registered in the standard record while the status after the updating must be registered in the empty record. In the following description in conjunction with FIG. 5, a record where the status before the updating has been registered (the standard record as previously mentioned) is referred to as an "earlier standard record". Also, a record where the status after the updating has been registered (the empty record as previously mentioned) is referred to as a "standard record".

At step S126, the access unit 13 registers address information of the standard record in the management record as a physical record address. At step S127, the access unit 13 registers location information of the physical record address associated with the standard record in a current record address of the management record. At step S128, the access unit 13 modifies the earlier standard record into a deletion record. The modification into the deletion record means that information (deletion flag) indicating that the relevant record corresponds to a deletion record is recorded. The deletion flag may be recorded in the relevant record (physical record) or in the memory device 103 in association with the relevant record. At step S129, a commit operation is performed.

Figure 6:
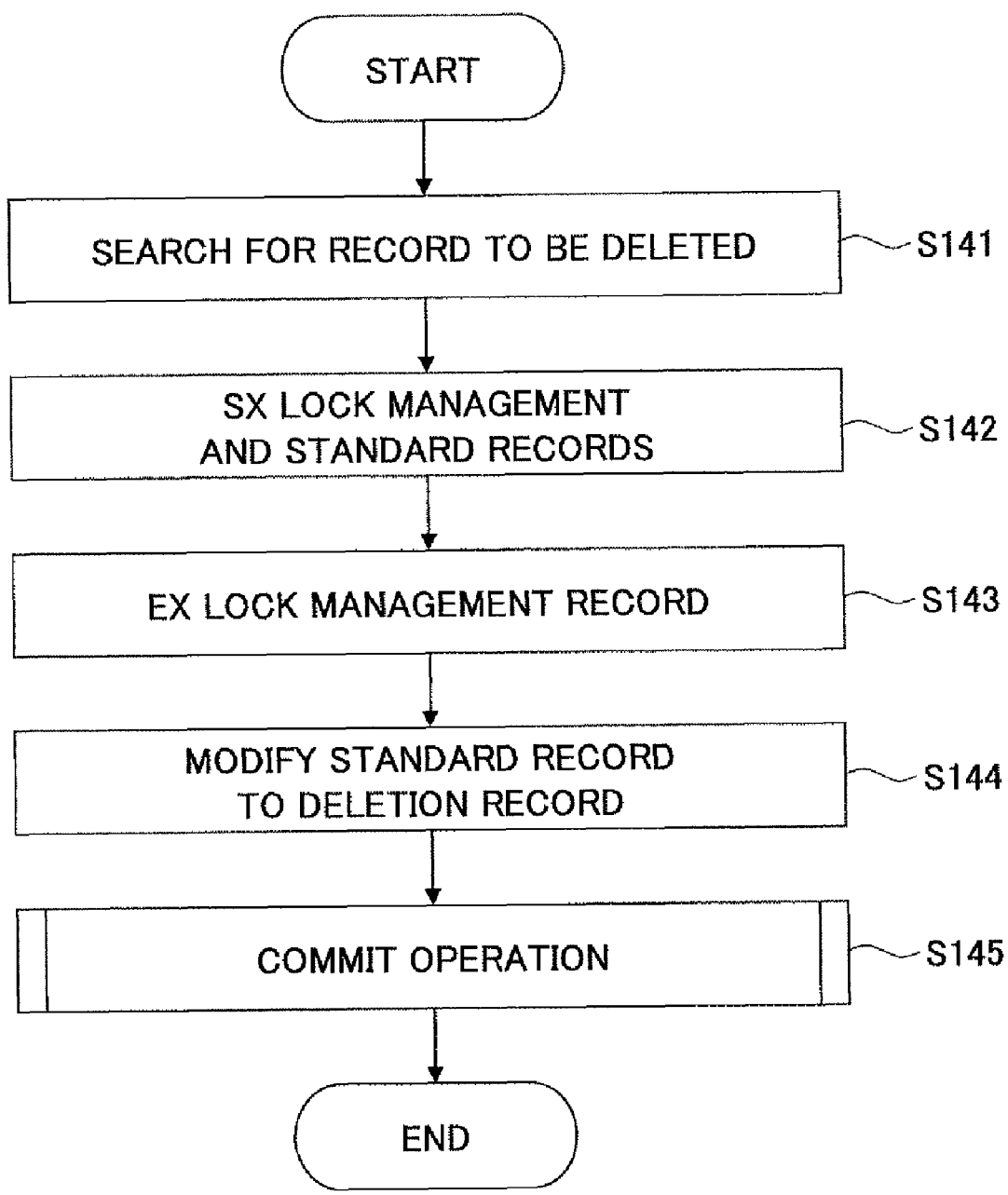
FIG. 6 is a flowchart illustrating an exemplary delete transaction.

Next, a delete transaction is described. FIG. 6 is a flowchart illustrating a processing procedure of a delete transaction.

In response to an instruction from the SQL execution control unit 12 that has received a data deletion instruction from the application server 20, at step S141, the access unit 13 searches the database 11 for a record (management record and standard record) associated with data to be deleted (hereinafter referred to as "deletion data"). At step S142, the lock control unit 14 applies SX lock to the detected management record and standard record. At step S143, the lock control unit 14 applies EX lock to the management record to activate a deletion operation. At step S144, the access unit 13 modifies the standard record into a deletion record. The modification of the standard record to the deletion record has been described in conjunction with step S128 in FIG. 5, that is, a deletion flag is recorded for the relevant record. At step S145, a commit operation is performed.

As understood from the processing procedures illustrated in FIGS. 4-6, each record has lock status during an insertion operation, an update operation or a deletion operation as follows. The term "during an operation" means status before a commit operation.

Figure 7A:
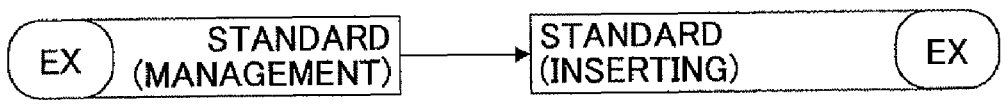
FIG. 7 illustrates an exemplary lock condition of a target record to be manipulated.
Figure 7B:
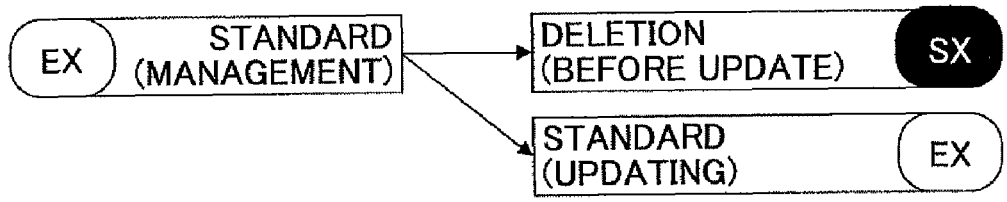
Figure 7C:
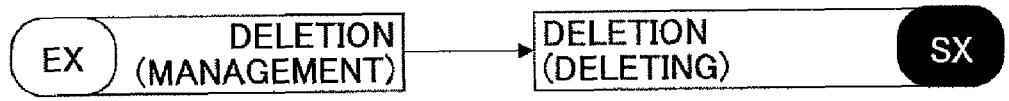

FIG. 7 illustrates lock status of records to be manipulated. FIG. 7A illustrates lock status during an insertion operation. During the insertion operation, EX lock is applied to the management record and the insertion record (see FIG. 4). FIG. 7B illustrates lock status during an update operation. In the update operation, EX lock is applied to the management record and the standard record while SX lock is applied to a deletion record (or an earlier standard record before modification into the deletion record) (see FIG. 5). Thus, the deletion record will be made referable during the update operation. FIG. 7C illustrates lock status during a deletion operation. During the deletion operation, EX lock is applied to the management record while SX lock is applied to the deletion record (or the standard record before modification into the deletion record). Thus, the deletion record will be made referable during the deletion operation. Note that information (occupation information) indicative of lock details (status) of each record is stored (maintained) in the memory device 103 for each transaction as a portion of transaction information.

Figure 8:
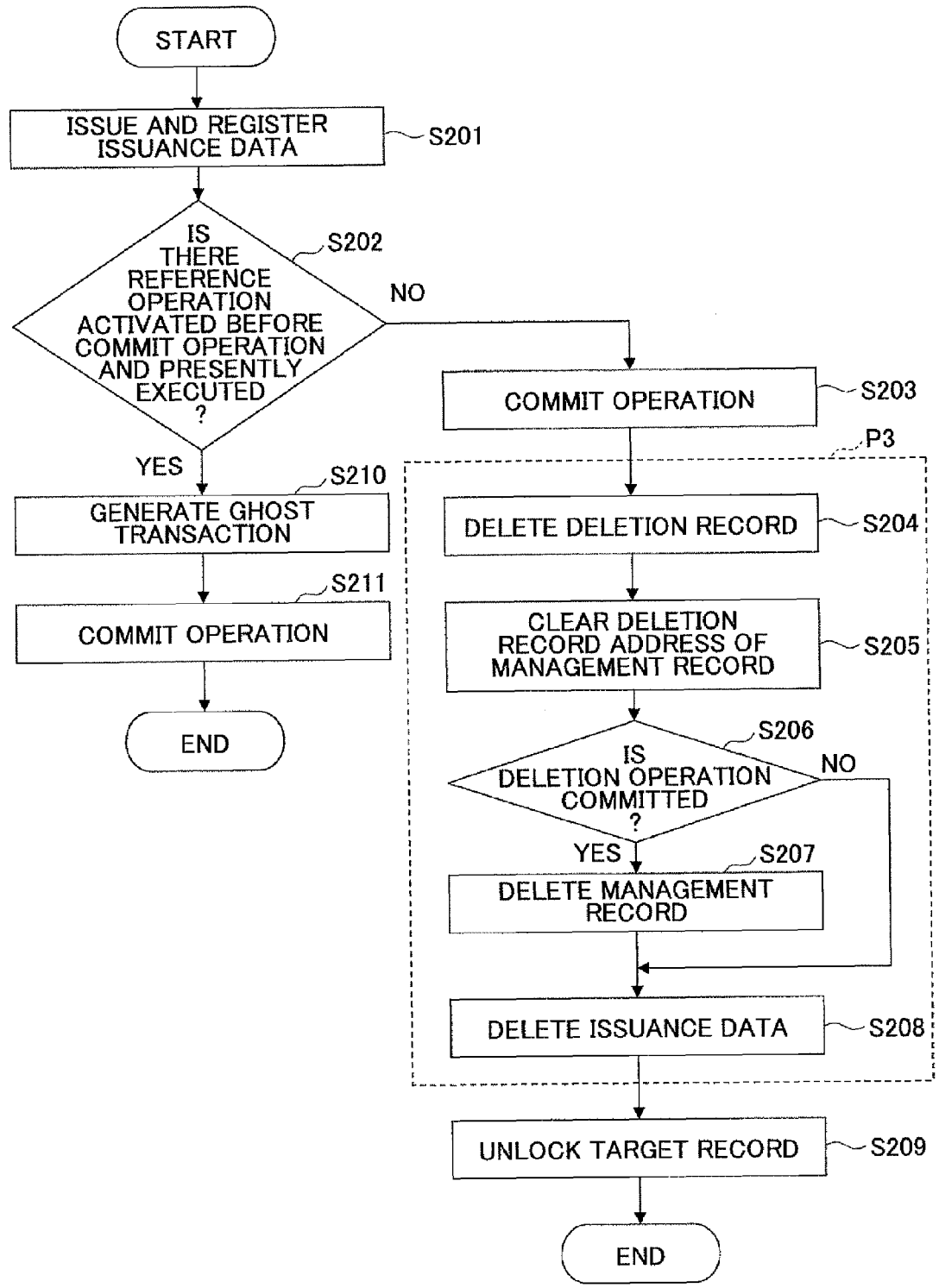
FIG. 8 is a flowchart illustrating an exemplary processing procedure of a commit operation.

Next, commit operations in steps S106, S129 and S145 are described. FIG. 8 is a flowchart illustrating a processing procedure of a commit operation. In this illustration, records may be records associated with data to be manipulated in a transaction to be committed (hereinafter referred to as "current transaction").

Upon activation of a commit operation, at step S201, the access unit 13 issues issuance data to the current transaction and stores the issuance data in an issuance data storage area in association with the current transaction. The issuance data storage area may be a predefined memory area within the memory device 103.

FIG. 9 illustrates an exemplary configuration of issuance data. In this illustration, issuance data 150 may include a node number, a target data ID, a time-series number and an issuance time type. The node numbers may be numbers (identifiers) for identifying individual database servers 10 (nodes) in an arrangement including multiple database servers 10 such as load share (load distribution) environments (multiple node environments). As a result, the node number may be unnecessary in single node environments as illustrated in FIG. 1. The target data ID may be an identifier for data to be manipulated in a transaction where the issuance data 150 is to be issued. If multiple data pieces are subject to manipulation, multiple target data IDs are registered. The time-series number may be a number for identifying issuance order of the issuance data 150 (chronological relationship). For example, the successive time-series numbers may be assigned to respective issuance data pieces 150. Note that the time-series number may not be limited to assignment to predefined data and may be arbitrary as long as it can identify individual data pieces chronologically. For example, the time-series number may be time and any other signs. The issuance time type may be information indicative of types (reference activation time or commit activation time) of issuance time (timing) of the issuance data 150. In other words, the issuance data 150 may be issued at not only timing of step S201 (commit activation time) but also reference activation time. Note that the issuance data 150 issued at the reference activation time may be deleted upon completion of that reference.

At step S202, the access unit 13 determines whether there is a reference operation (hereinafter referred to as "concurrent reference operation") for referring to data to be manipulated in the current transaction that is activated before this commit operation and presently performed. This determination is made based on the issuance data 150. Specifically, it is determined whether there is issuance data 150 that include a target data ID at least partially duplicated with the target data ID of the issuance data 150 issued at step S201, have the issuance time type indicative of reference activation and have the time-series number smaller than that of the issuance data 150 issued at step S201. If such issuance data 150 is present, it is determined that the concurrent reference operation is present. On the other hand, if such issuance data 150 is not present, it is determined that the concurrent reference operation is not present.

Figure 10:
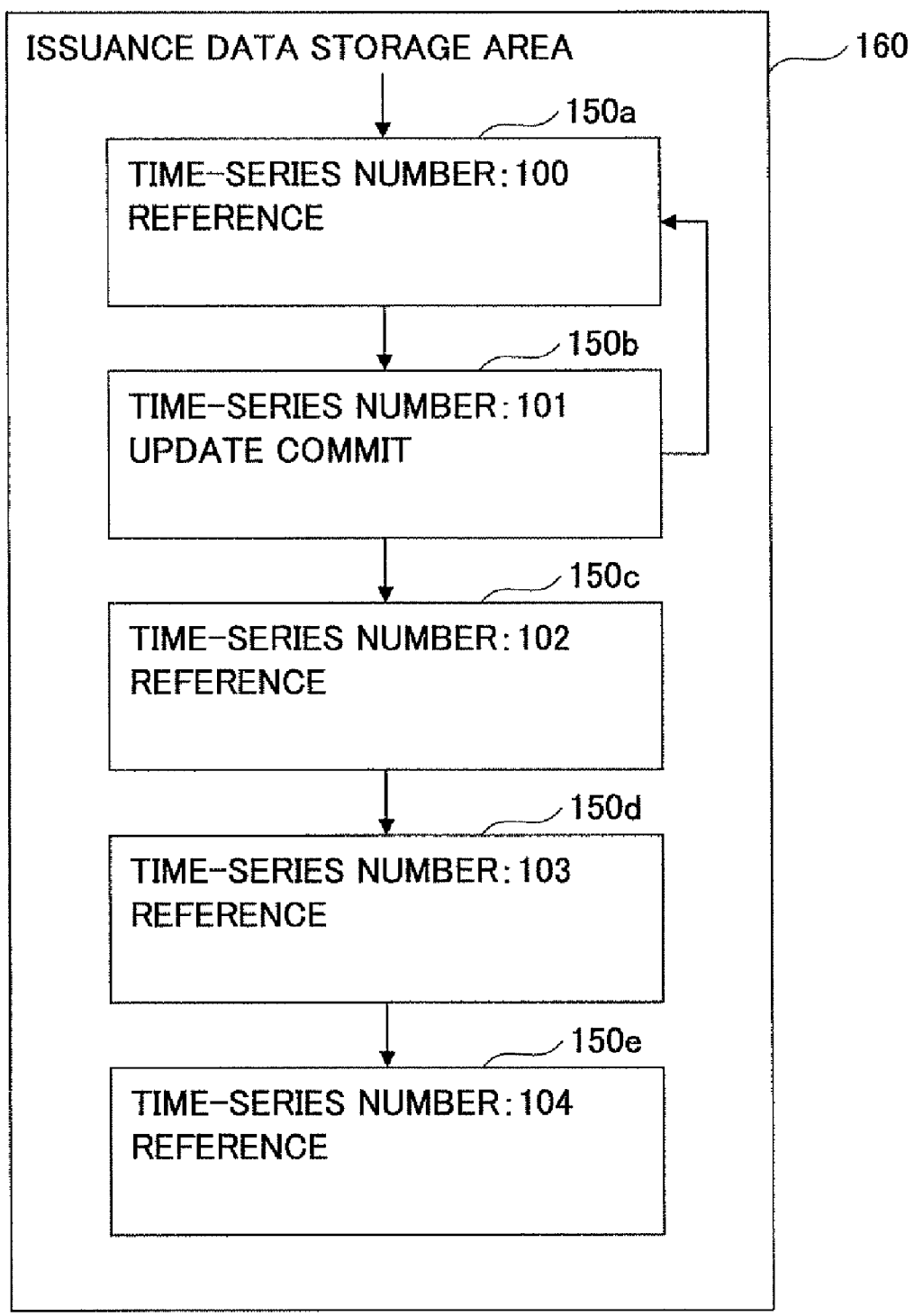
FIG. 10 illustrates an exemplary determination operation as to whether there is a concurrent reference operation based on issuance data.

For example, FIG. 10 illustrates an exemplary determination operation as to whether there is a concurrent reference operation based on issuance data. In this illustration, issuance data 150 stored in an issuance data storage area 160 is arranged in issuance order.

In this illustration, the issuance data 150a may be issuance data 150 issued at activation of the reference operation and having the time-series number "100". On the other hand, the issuance data 150b may be issuance data issued at committing time of update and having the time-series number "101". The time-series number "100" of the issuance data 150a is smaller than the time-series number "101" of the issuance data 150b. Thus, this may mean that the reference operation on the issuance data 150a is earlier than the committing of the update of the issuance data 150b. In addition, the presence of the issuance data 150a may mean that the reference operation has not been completed yet. Accordingly, it may be determined that the concurrent reference operation is present.

If no concurrent reference operation is present (NO: S202), in response to this notification, the access unit 13 commits the current transaction (S203). At step S204, if a deletion record is present, the access unit 13 deletes the deletion record. At step S205, the access unit 13 clears a physical data address corresponding to the deletion record from physical data addresses registered in the management record. Then, if this commit operation is for a transaction including a deletion operation (YES: S206), at step S207, the access unit 13 deletes the management record associated with the deleted data. At step S208, the access unit 13 deletes the issuance data 150 generated at step S201. At step S209, the lock control unit 14 unlocks (release lock) a record locked in the current transaction. Specifically, the lock control unit 14 clears or deletes occupation information associated with the current transaction.

On the other hand, if the concurrent reference operation is present (YES: S202), the access unit 13 notifies the ghost daemon 15 that the concurrent reference operation is present. In response to this notification, at step S210, the ghost daemon 15 generates a ghost transaction in order to prevent deletion of a record referred to in the concurrent reference operation. At this time, the ghost daemon 15 causes the ghost transaction to inherit the occupation information of the current transaction and the issuance data 150. The inheritance of the occupation information to the ghost transaction (that is, prevention of the occupation information from being deleted in response to a commit operation on the current transaction) may prevent deletion of the record referred to in the concurrent reference operation. This is why the lock control unit 14 controls locking of the database 11 based on and also with reference to the occupation information possessed by the ghost transaction. The ghost transaction may be implemented as data generated within the memory device 103 for managing the occupation information. Thus, the inheritance of the occupation information into the ghost transaction may correspond to storage of the occupation information in the memory device 103. Note that if the data has the same format as other normal transaction information, information indicating whether it is the ghost transaction may be recorded in the data. At step S211, the access unit 13 commits the current transaction. As a result, the current transaction could be transitioned to the ghost transaction.

Figure 11:
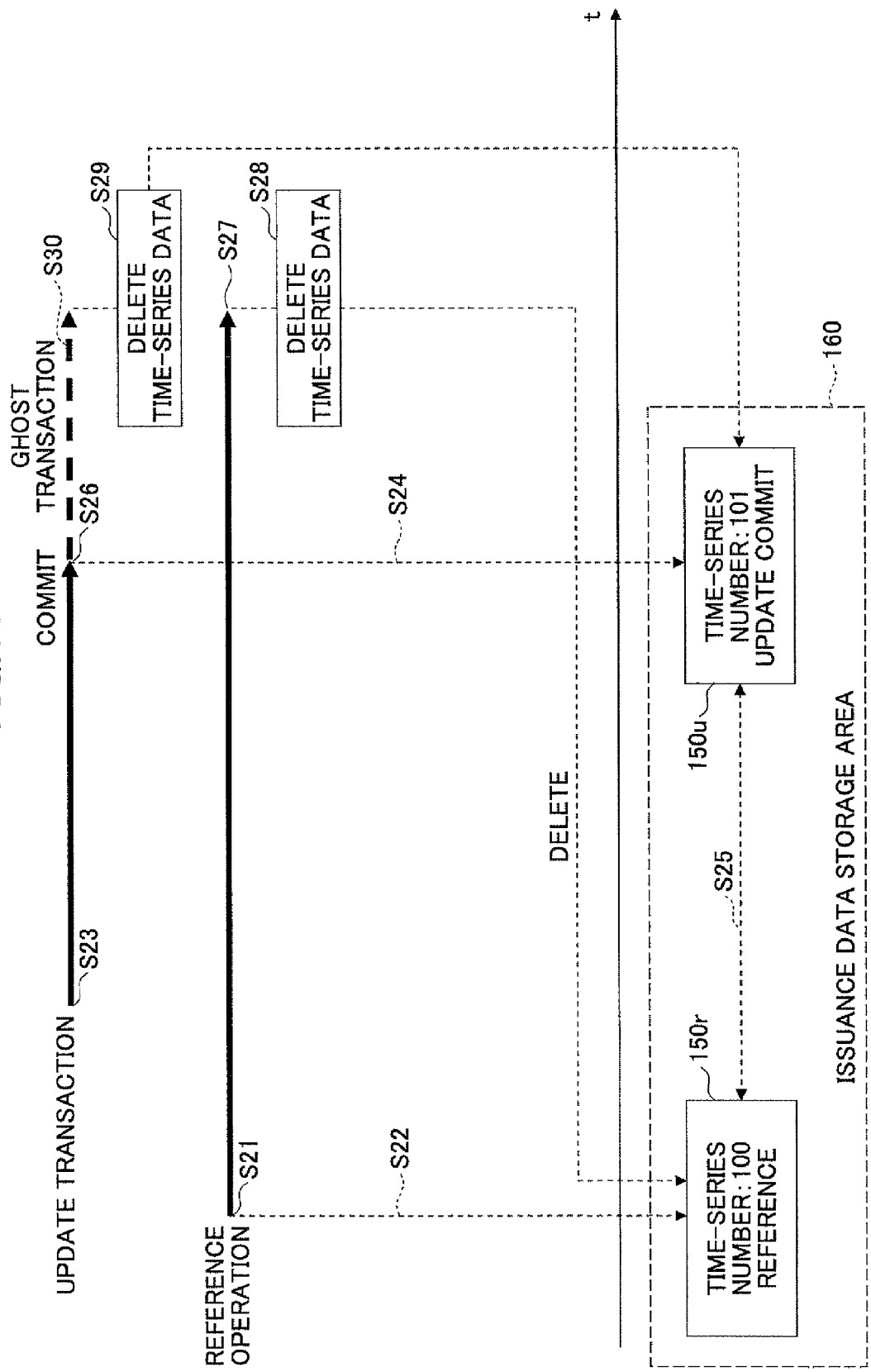
FIG. 11 illustrates exemplary specific generation triggering of a ghost transaction.

As is obvious from FIG. 8, the ghost transaction may be generated in response to exemplary triggers as presented below. FIG. 11 illustrates an exemplary trigger of generating a ghost transaction. In this illustration, the time advances from the left to the right. Also, bold arrows represent a reference operation or an update transaction. A bold dashed line represents a ghost transaction. In addition, target data for the reference operation may be at least partially duplicated with target data for the update transaction.

In this illustration, a reference operation is activated at step S21. At step S22, in response to activation of the reference operation, issuance data 150*r* is issued for the reference operation and registered in an issuance data storage area 160. At step S23, an update transaction is activated. In this embodiment, a share lock is not applied in the reference operation. Thus, if presently referred data is updated, no share lock is applied to the data. When, the update transaction is committed, at step S24, issuance data 150*u* is issued for the update transaction and registered in the issuance data storage area 160. At this time, it is determined whether the update transaction should be transitioned to a ghost transaction. In this embodiment, the issuance data 150*r* having a time-series number smaller than that of the issuance data 150*u* may be present at step S25. Accordingly, at step S26, the update transaction is transitioned to the ghost transaction. Once a reference operation causing the transition to the ghost transaction is completed at step S27, the issuance data 150*r* for this reference operation is deleted at step S28. As a result, since there is no issuance data 150 having a time-series number smaller than that of the issuance data 150*u*, the issuance data 150*u* is deleted at step S29 and then the ghost transaction is completed at step S30.

Figure 12:
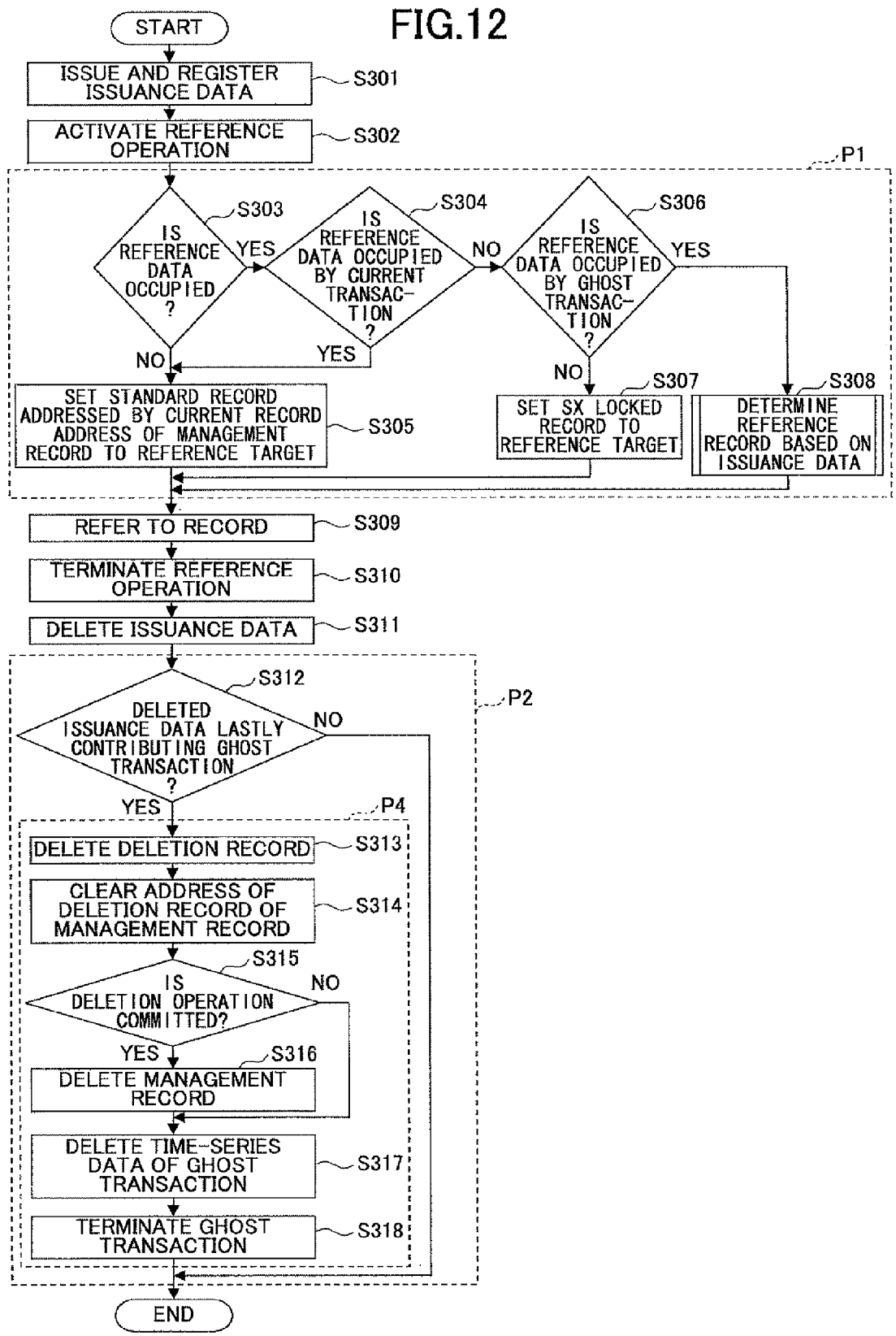
FIG. 12 is a flowchart illustrating an exemplary processing procedure of a reference operation.

Next, a reference operation to data is described. FIG. 12 is a flowchart illustrating an exemplary processing procedure of the reference operation.

At step S301, in response to an instruction from the SQL execution control unit 12 that has received a data reference instruction from the application server 20, the access unit 13 issues issuance data 150 (FIG. 9) for a transaction (current transaction) where this reference operation is performed and registers the issuance data 150 in the issuance data storage area 160. Note that a value indicative of activation of the reference operation is registered into the issuance time type of the generated issuance data 150.

At step S302, the database server 10 starts to refer to target data (hereinafter referred to as "reference data"). Note that no share lock is applied in the reference operation in this embodiment as mentioned above.

At step S303, the lock control unit 14 determines whether a record associated with the reference data has been already locked (occupied). This determination is made based on the occupation information of a presently executed transaction (including a ghost transaction). Note that a record described below in conjunction with FIG. 12 may be associated with the reference data.

If no lock is applied (NO: S303) or if the current transaction applies lock (YES: S304), at step S305, the access unit 13 refers to a standard record associated with a physical record address pointed out by the current record address in a management record.

On the other hand, if other transactions apply lock (NO: S304), at step S306, the lock control unit 14 determines whether a ghost transaction applies the lock. This determination may be made based on information recorded in association with the occupation information (information indicating whether the ghost transaction applies the lock).

If the ghost transaction does not apply the lock (this case corresponds to a case where a transaction applying the lock still remains) (NO: S306), at step S307, the access unit 13 refers to a SX lock applied record among the standard record and the deletion record. For example, the deletion record will be referred to under conditions as illustrated in FIG. 7B or 7C. However, the standard record will be referred to before modification of the standard record into the deletion record (FIG. 6), for example, in FIG. 7C. On the other hand, if the ghost transaction applies the lock (this case corresponds to a case where a transaction applying the lock has been already committed) (YES: S306), at step S308, the access unit 13 determines a reference target based on the generated issuance data 150. This step is described in detail below.

The access unit 13 refers to a record to be referred to at step S309 and completes the reference operation at step S310. At step S311, the access unit 13 deletes the issuance data issued at step S301.

Then, if it is determined whether there is a ghost transaction finished by the deletion of the issuance data 150 and there is a ghost transaction that can be completed, a termination operation is performed on all the ghost transactions that can be completed. As a result, if such a ghost transaction is not present, subsequent operation P4 illustrated in dashed lines in FIG. 12 will not be performed. Note that the operation P4 is performed by the ghost daemon 15 asynchronously with the reference operation.

At step S312, the access unit 13 determines whether the deleted issuance data 150 is associated with the reference operation lastly contributing to the ghost transaction. The "reference operation lastly contributing to the ghost transaction" means a reference operation applied to the same data before a commit operation on a source transaction from which the ghost transaction is transitioned.

Figure 13:
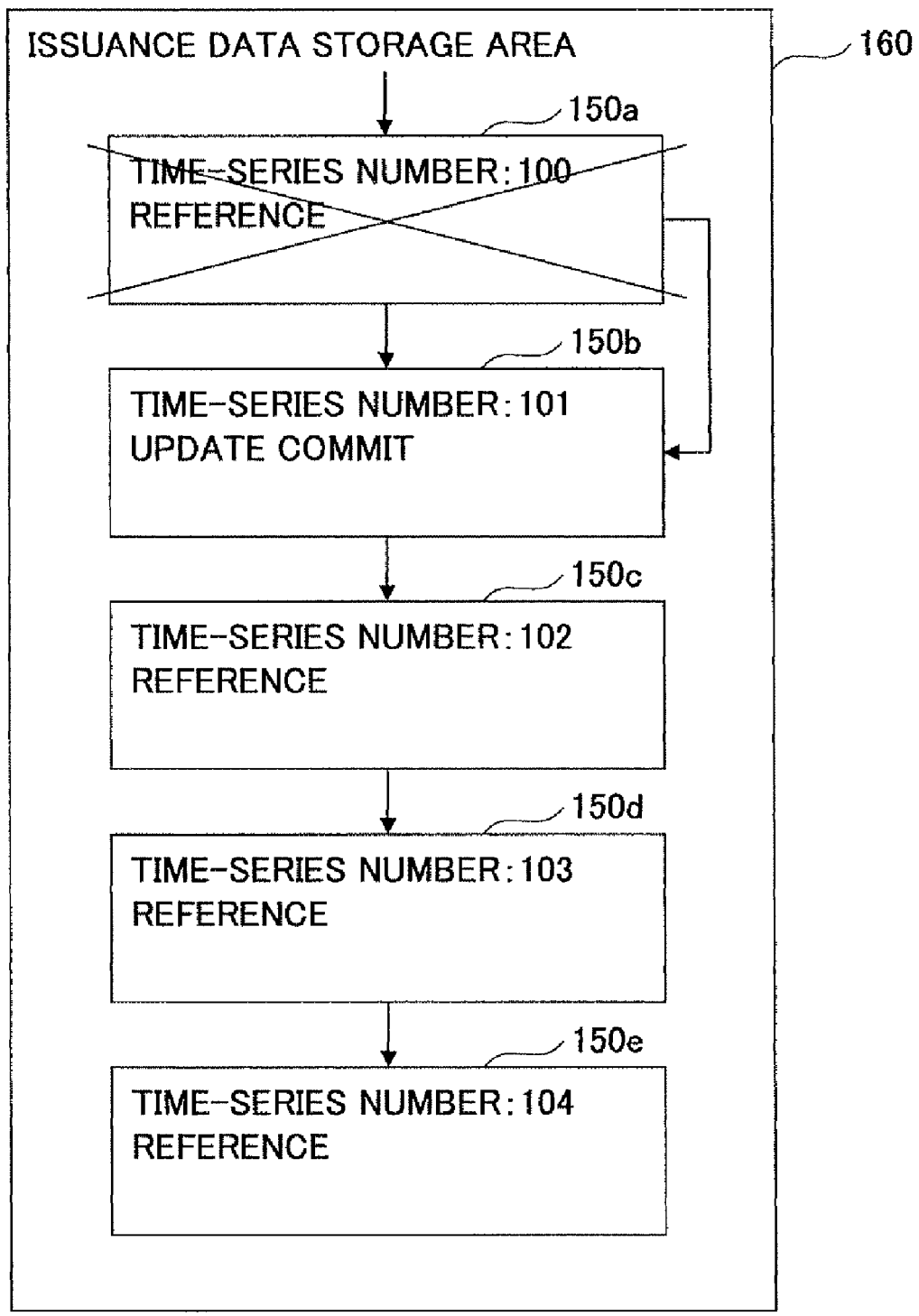
FIG. 13 illustrates an exemplary determination operation as to whether all reference operations lastly contributing to a ghost transaction are completed.

In FIG. 13, a detailed operation of the determination operation is illustrated. FIG. 13 illustrates an exemplary detailed determination operation as to whether the reference operation lastly contributing to the ghost transaction is completed. In FIG. 13, the same portions as FIG. 10 are designated by the same reference numerals. It is assumed in FIG. 13 that the issuance data 150*b* is the issuance data 150 associated with the ghost transaction. Accordingly, the issuance data 150*a* will be the issuance data 150 associated with the reference operation contributing to the ghost transaction.

In this illustration, the issuance data 150*a* having a time-series number smaller than that of the issuance data 150*b* is deleted. In the illustration, the sign "X" represents deletion. Also, no issuance data 150 having the time-series number smaller than that of the issuance data 150*b* other than the issuance data 150*a* is present. In this case, thus, it is determined that the deleted issuance data 150*a* lastly contributed to the ghost transaction, that is, that all the reference operations contributing to the ghost transaction have been completed. On the other hand, if the determination operation is under the condition as illustrated in FIG. 10, it is determined that all the reference operations contributing to the ghost transaction have not been completed, that is, that a further reference operation contributing to the ghost transaction is present in addition to the completed reference operations.

If there is a ghost transaction determined to be allowed for completion (YES: S312), the access unit 13 notifies the ghost daemon 15 of it. In response to this notification, if a deletion record is present, the ghost daemon 15 deletes the deletion record at step S313. At step S314, the ghost daemon 15 clears a physical data address corresponding to the deletion record from physical data addresses registered in a management record. At step S315, the ghost daemon 15 determines whether the ghost transaction has been activated in a commit operation on a transaction including the deletion operation. This determination may be made based on the issuance time type of the issuance data 150 associated with the ghost transaction. If the ghost transaction is activated in the commit operation of the transaction including the deletion operation (YES: S315), at step S316, the ghost daemon 15 deletes the management record associated with the deleted data. At step S317, the ghost daemon 15 deletes the issuance data 150 associated with the ghost transaction. At step S318, the ghost daemon 15 completes the ghost transaction. Specifically, the ghost daemon 15 deletes data implementing the ghost transaction. As a result, the occupation information included in the data is also cleared or deleted, and thus the lock applied by the ghost transaction is unlocked.

In this manner, when all the reference operations contributing to the ghost transaction have been completed, the ghost transaction is completed and the lock applied by the ghost transaction will be released.

Figure 14:
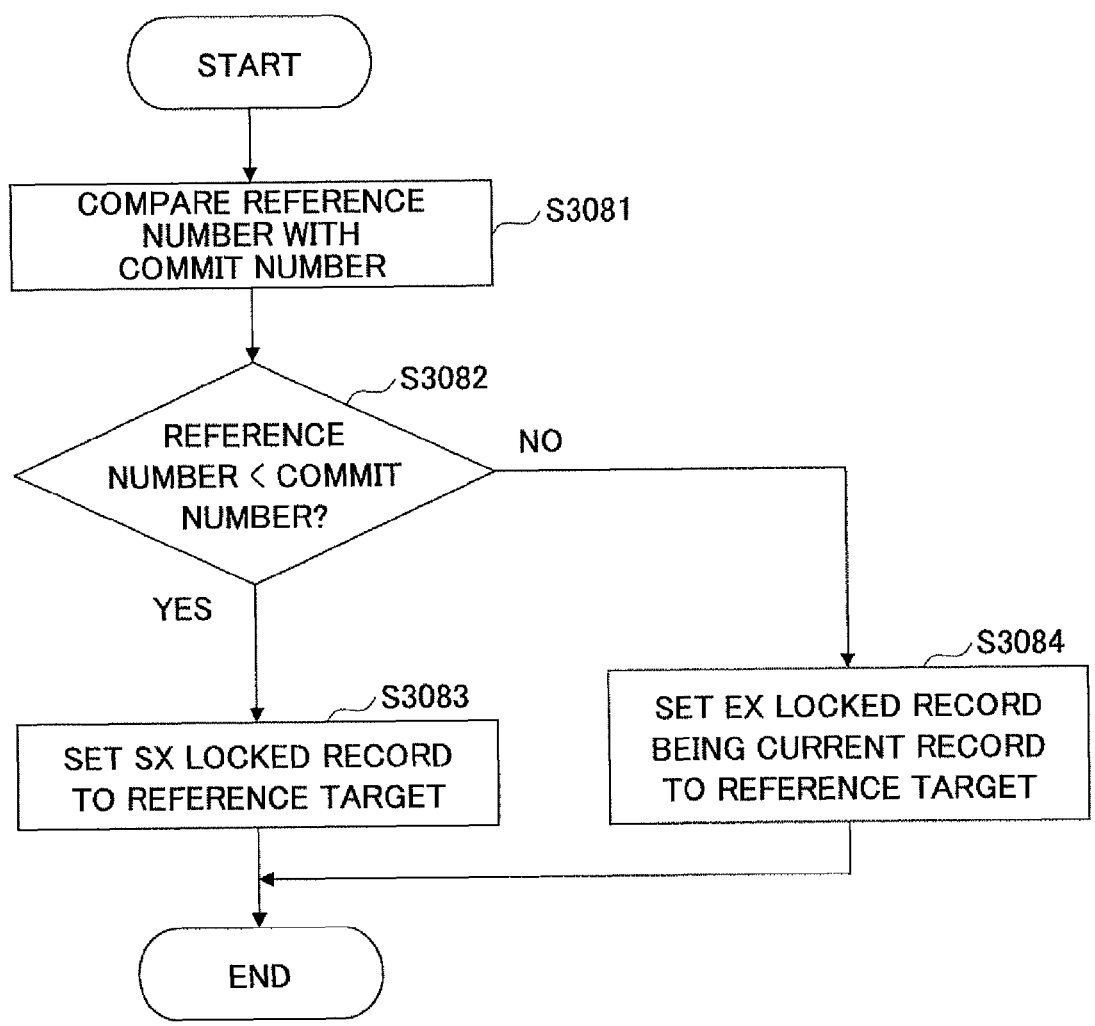
FIG. 14 is a flowchart illustrating an exemplary determination operation of a target record to be referred to for data occupied in a ghost transaction.

Next, detailed operations at step S308 are described. FIG. 14 is a flowchart illustrating an exemplary determination operation on data to be referred to for data occupied by the ghost transaction.

At step S3081, the access unit 13 compares the time-series number (reference number) of the issuance data 150 generated in the reference operation at step S301 with the time-series number (commit number) of the issuance data 150 associated with the ghost transaction applying the lock. If the reference number is smaller than the commit number (YES: S3082), at step S3083, the access unit 13 will refer to an SX locked record. If the reference number is greater than the commit number (NO: S3082), at step S3084, the access unit 13 will refer to an EX locked record associated with a physical record address pointed by the current record address of the management record.

Figure 15:
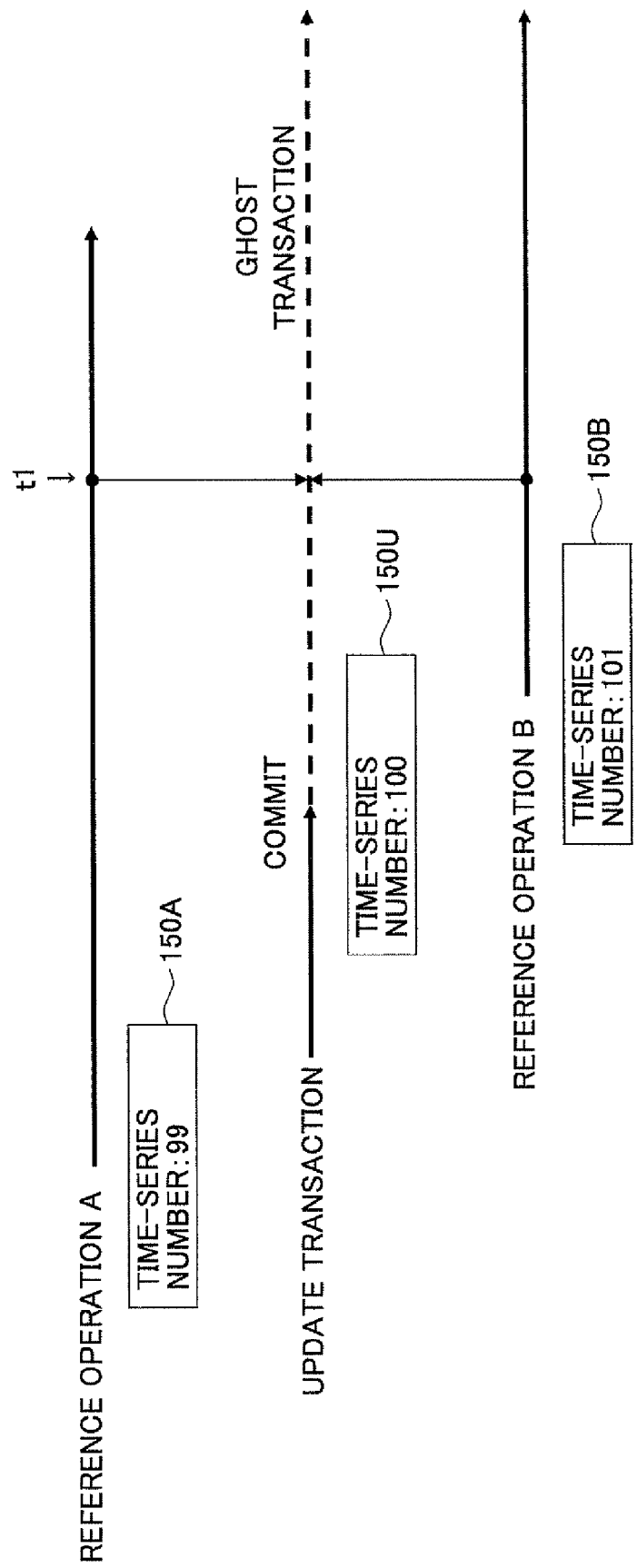
FIG. 15 illustrates an exemplary detailed determination operation of a target record to be referred to for data occupied in a ghost transaction.

Detailed operations in the operation illustrated in FIG. 14 are described. FIG. 15 illustrates exemplary detailed operations of a determination operation for a record to be referred to for data occupied by the ghost transaction. In this illustration, the time advances from the left to the right. Also, bold arrows represent a reference operation or an update transaction. A bold dashed arrow represents a ghost transaction.

In the illustration, a reference operation A is first activated, and issuance data 150A with time-series number "99" is issued. Then, an update transaction is committed, and issuance data 150U with the time-series number "100" is issued. When, the update transaction is being committed, the update transaction is transitioned to a ghost transaction because of the reference operation A being a concurrent reference operation. Then, a reference operation B is activated, and issuance data with the time-series number "101" is issued.

Next, both of the reference operations A and B attempt to refer to data occupied by the ghost transaction at a time point t1. Since the reference operation A has the time-series number "99" smaller than the time-series number "100" of the ghost transaction at this time, that is, since the reference operation A is activated before committing of the update transaction, an SX locked record (record before updating (deletion record)) is referred to (corresponding to S3083). On the other hand, since the reference operation B has the time-series number "101" greater than the time-series number "100" of the ghost transaction, that is, since the reference operation B is activated after committing of the update transaction, an EX locked record (record after the updating (standard record)) is referred to (corresponding to S3084). In this manner, the time-series numbers can be used for determination of physical records to be referred to.

As mentioned above, according to the first embodiment, for presently updated data, a consistent record (deletion record) that has been already committed at activation of a reference operation can be referred to without waiting for unlock. Thus, access efficiency to databases can be improved.

Also, chronological relationship of committing timings of an update operation and/or others or activation timing of a reference operation can be comprehended through the issuance data 150. Thus, it can be determined whether a reference operation to the same data is present at the committing time. As a result, it is possible to prevent a presently referred record (deletion record) from being deleted depending on commit operations on the update operation and/or others. Also, the issuance data 150 is deleted at completion of the reference operation, and it is accordingly determined whether the issuance data 150 issued before committing of the update operation and/or others is present. As a result, if the issuance data 150 is not present, the deletion record can be deleted. Therefore, it is possible to delete the deletion record at an appropriate timing.

Also, if reference operations to the same data are present at committing of an update operation and/or others, the occupation information on a transaction associated with the update operation and/or others is inherited and maintained into a ghost transaction without deletion corresponding to the committing. Then, the ghost transaction remains until the reference operation is completed. Accordingly, appropriate lock control can be applied to data to be referred to.

In addition, since at most two versions (standard record and deletion record) are managed for each data, it is possible to design the capacity of database storage areas more easily.

Furthermore, unlike conventional reference counters, the issuance data 150 is stored in the fast accessable memory device 103. In other words, the issuance data 150 is not recorded in any physical record in the database 11. As a result, it is possible to prevent degraded performance of the reference operation. Even if all prior reference counters are managed in a memory, this embodiment may be advantageous over the prior art. Specifically, it is assumed that multiple records, for example, 1000 records, are referred to at one time in a reference operation. In this case, 1000 reference counters are updated in the prior art, resulting in consumption of more CPUs and memories. In this embodiment, however, 1000 target data IDs are managed in the single issuance data 150. Thus, only the single issuance data 150 has to be generated or deleted. In this manner, this embodiment would be more advantageous over the prior art as a larger number of data are referred to at one time.

In addition, even if some faults occur in the database 11, management of the issuance data 150 in the memory device 103 can make it unnecessary to correct the reference counter. As a result, it is possible to fulfill fast recovery operations.

In this manner, this embodiment could be particularly advantageous for databases where a larger number of reference operations are performed and that have higher load on the reference operations.

Also, according to this embodiment, unnecessary reference data, that is, data that no longer is referred to, is deleted in background processes by the ghost daemon 15, which may suppress increasing load on the reference operation.

Note that the target data ID is not required in the issuance data 150. If the target data ID is not provided, the issuance data 150 with a different reference target or update target is also compared in a commit operation (FIG. 8) or at reference completion (FIG. 12). Even in this case, however, deletion of a record presently referred to in a commit operation for an update operation and/or others can be prevented while maintaining concurrency of the update operation with the reference operation. In this case, completion of the ghost daemon may be delayed and thus the ghost daemon may unnecessary keep locking. As a result, there is a risk that other update operation and/or others may be locked. If such a risk is taken into account, it is desirable that the target data ID is managed in the issuance data 150 as in this embodiment.

Next, a second embodiment is described. In the second embodiment, some features different from the first embodiment is particularly described. Thus, if some features are not specifically described in the second embodiment, they may be the same or similar ones as the first embodiment.

Figure 16:
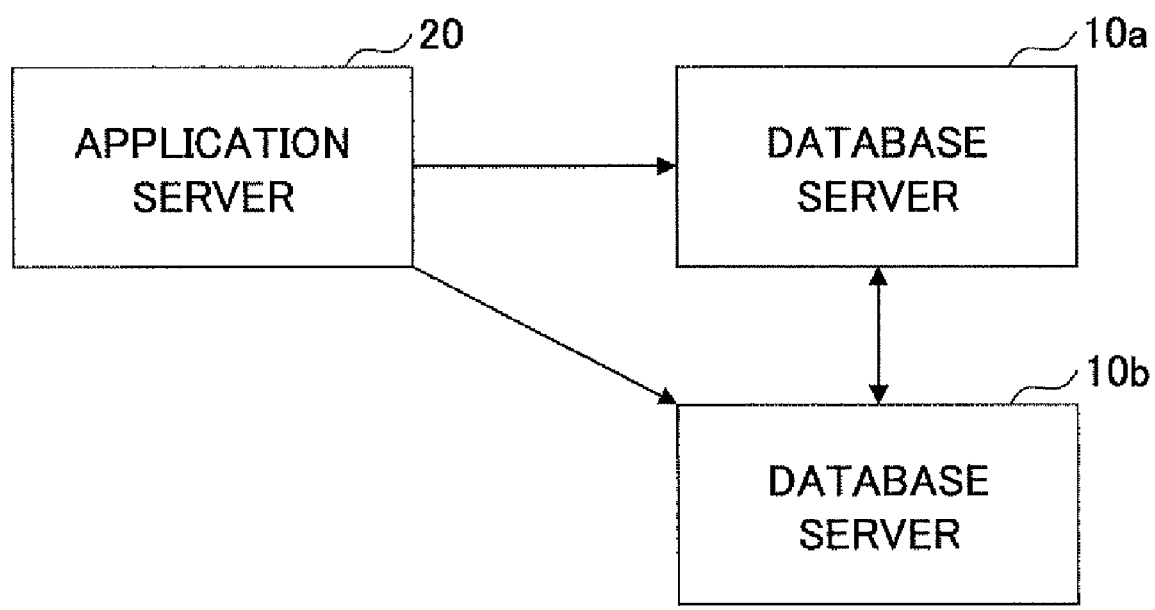
FIG. 16 illustrates an exemplary configuration of a data management system according to a second embodiment.

FIG. 16 illustrates an exemplary configuration of a data management system according to the second embodiment. In FIG. 16, the same portions as FIG. 1 are designated by the same reference numerals, and descriptions thereof are omitted.

As illustrated in FIG. 16, in the second embodiment, two or more nodes (database servers 10*a*, 10*b*) are coupled to an application server 20. Thus, a load share environment is fulfilled in the data management system according to the second embodiment. Accordingly, the application server 20 can execute SQL statements through connection to arbitrary database servers 10. Note that the database servers 10 may have the same configuration as that illustrated in FIG. 1. If respective components in the two database severs 10 are differentiated, the components in the database server 10*a* are designated by reference numerals with suffix "a" while components in the database server 10*b* are designated by reference numerals with suffix "b".

Figure 17:
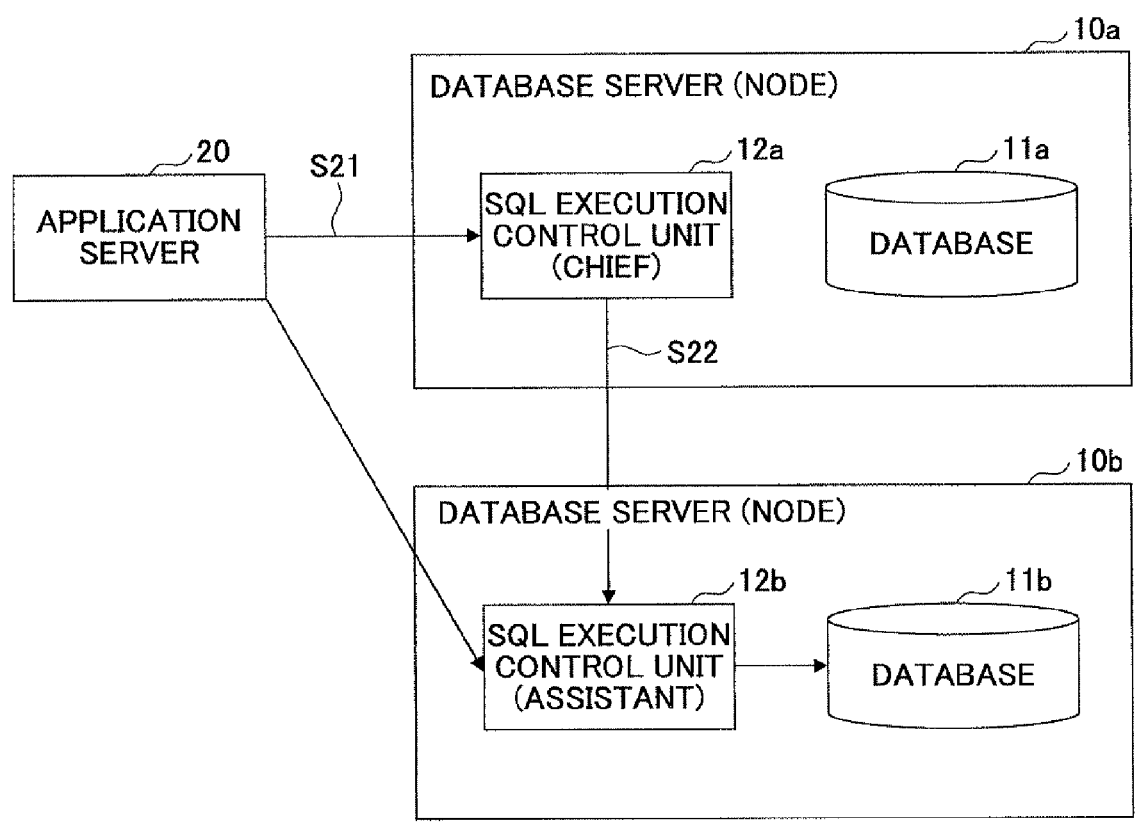
FIG. 17 illustrates an exemplary general operation of the data management system according to the second embodiment.

FIG. 17 illustrates a general operation of the data management system according to the second embodiment. In this illustration, the access unit 13, the lock control unit 14 and the ghost daemon 15 are omitted for convenience.

It is assumed that after establishment of connection of the application server 20 to one of the database servers 10 (in this illustration, the database server 10*a*), execution of SQL is requested for data managed in the other database server 10 (the database server 10*b*) at step S21. At step S22, the SQL execution control unit 12*a* in the database server 10*a* requests the SQL execution control unit 12*b* in the other node to control the execution of SQL. In this case, the database server 10*a* established connectively to the application server 20 is referred as a "chief node". On the other hand, the database server 10*b* requested by the chief node to control the execution of SQL is referred to as an "assistant node".

In load share environments, however, different nodes may not have uniform system time. As a result, if chronological relationship of transactions and/or others is determined based on the respective system time of different nodes, there is a risk that the correct chronological relationship may not be obtained. For this reason, in the second embodiment, the above-mentioned problem in the load share environments is taken into account, and an implementation for properly ensuring data consistency and synchronous executability of transactions by using the first embodiment is described.

Figure 18:
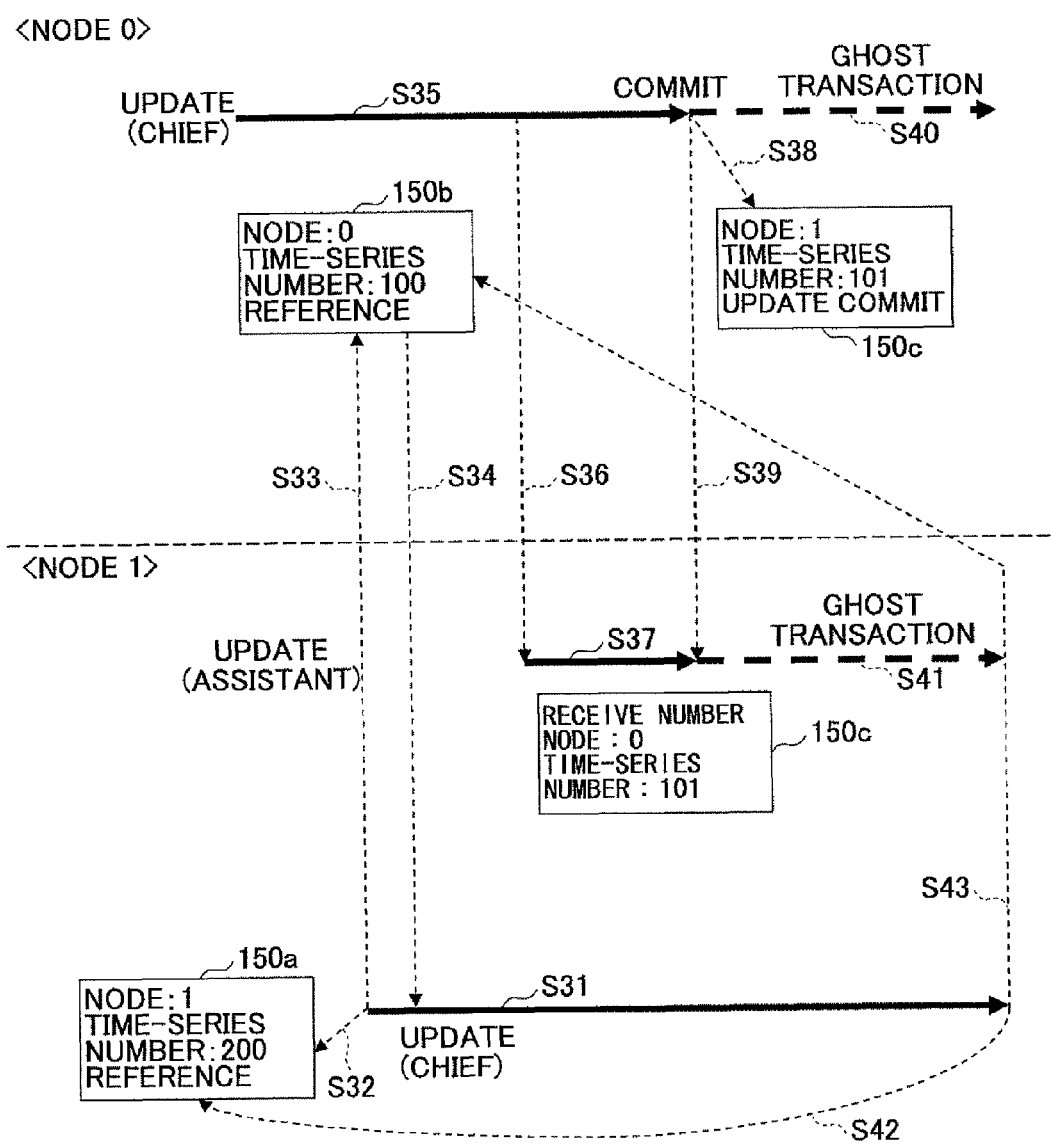
FIG. 18 illustrates an exemplary process of the second embodiment.
Figure 19:
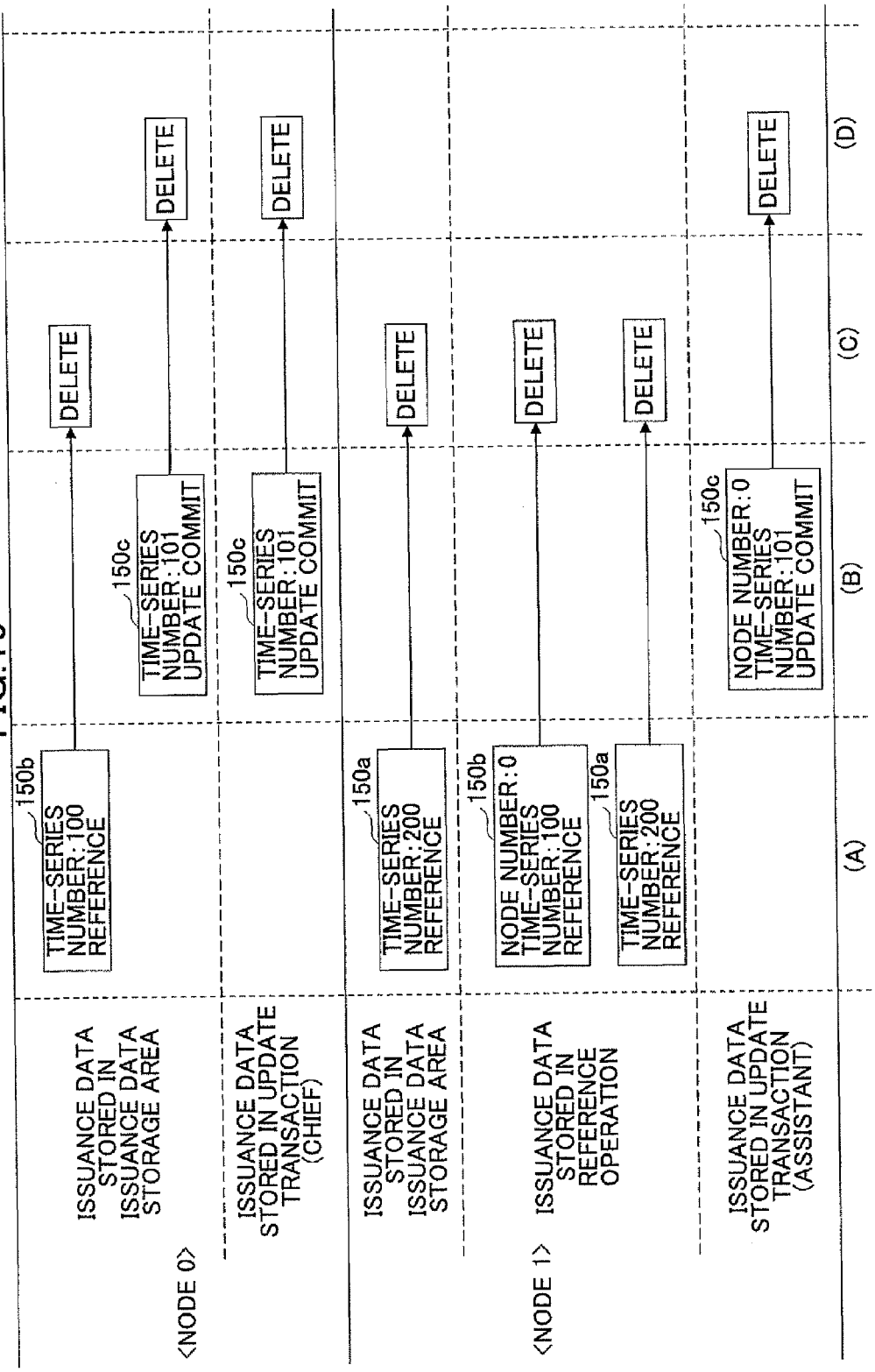
FIG. 19 illustrates exemplary transition of issuance data managed in nodes in the general process of the second embodiment.

FIG. 18 illustrates a general operation of the second embodiment. Also, FIG. 19 illustrates an exemplary transition of issuance data managed in nodes in the general operation of the second embodiment. In this illustration, node 0 represents the database server 10*a*, and node 1 represents the database server 10*b*. It is assumed in FIG. 18 that target data for a reference operation is the same as target data for an update transaction.

For example, when a reference operation is activated in node 1 at step S31, issuance data 150*a* (time-series number 200) is issued in node 1 at step S32. Note that node 1 serves as a chief node for that reference operation. At step S33, node 0 is informed of the fact that the reference operation has been activated in node 1, and issuance data 150*b* (time-series number 100) for the reference operation is issued in node 0. Note that the time-series number is consecutively assigned to different nodes. At step S34, the issuance data 150*b* issued in node 0 is transmitted to the reference operation in node 1. At this step, the issuance data 150 managed in the different nodes may have contents as illustrated in column (A) in FIG. 19. In other words, the issuance data 150*b* is managed in node 0. Also, the issuance data 150*a* is managed in node 1, and issuance data 150*a* and 150*b* are managed in the reference operation in node 1.

At step S35, in response to a request for updating data belonging to node 1, an update transaction is activated in node 1. In this case, node 0 serves as a chief node of the update transaction and requests the update transaction for node 1 at step S36. At step S37, node 1 activates the update transaction as an assistant node. When a commit operation for the update transaction is activated in node 0, at step S38, issuance data 150*c* (time-series number 101) is issued in node 0.

Then, it is determined whether the update transaction must be transitioned in node 0 to a ghost transaction. Referring to column (B) in FIG. 19, the issuance data 150*b* associated with the reference operation with the time-series number smaller than that of the issuance data 150*c* associated with the commit operation is present in node 0. Thus, at step S40, the update transaction is transitioned to the ghost transaction.

At step S39, node 0 transmits to node 1 the issued issuance data 150*c* together with notification of the commit operation and a determination result as to whether the update transaction must be transitioned to the ghost transaction. At this step, the issuance data 150 managed in the different nodes may have contents as illustrated in column (B) in FIG. 19. In other words, in addition to the issuance data 150 as illustrated in column (A), the issuance data 150*c* is added to node 0 and the respective update transactions in the nodes.

At step S41, in response to the notification of the commit operation and the determination result as to whether the update transaction must be transitioned to the ghost transaction, node 1 serves as the assistant node and commits the update transaction and performs the transition to the ghost transaction. In this illustration, issuance data 150 without any node number means that it is the issuance data 150 issued in its own node.

When the reference operation is completed in node 1, at step S42, node 1 deletes the issuance data 150*a* corresponding to the reference operation. Also, at step S43, node 1 requests node 0 to delete the issuance data 150*b* issued in node 0 for the reference operation. In response to this request, node 0 deletes the issuance data 150*b* managed in node 0. At this step, the issuance data 150 managed in the nodes may have contents as illustrated in column (C) in FIG. 19. Since the issuance data 150*a* and 150*b* are deleted, node 0 and the ghost transactions in the nodes maintain the issuance data 150*c*.

In response to the deletion of the issuance data 150a and 150b for the reference operation, each of node 1 and node 0 determines whether the ghost transaction should be completed. As illustrated in column (C) in FIG. 19, no issuance data 150 for the reference operation with the time-series number smaller than that of the issuance data 150c is present in node 0. Thus, the issuance data 150c stored in node 0 is deleted, and the respective ghost transactions are completed. At this step, the issuance data 150 managed in the nodes and the operations may be illustrated in column (D) in FIG. 19.

Figure 20:
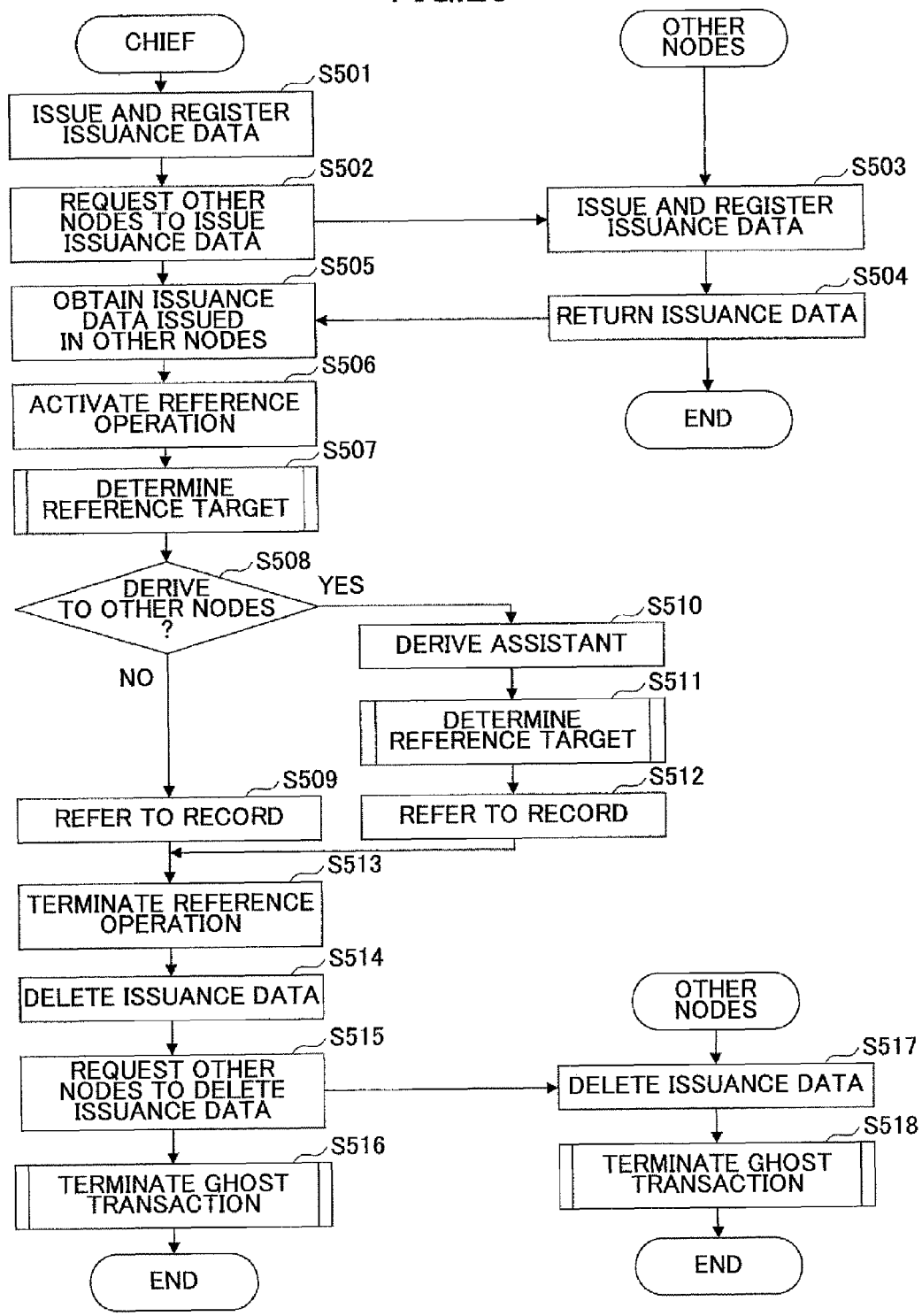
FIG. 20 is a flowchart illustrating an exemplary processing procedure of a reference operation according to the second embodiment.

The operations described in conjunction with FIGS. 18 and 19 are generalized and described in flowcharts. FIG. 20 is a flowchart illustrating a processing procedure for the reference operation according to the second embodiment. This illustration may correspond to FIG. 12 in the first embodiment. Note that the "chief node" represents a node (database server 10) that has received a request for the reference operation from the application server 20 in this illustration. The "other nodes" represent all nodes other than the chief node.

In response to an instruction from the SQL execution control unit 12 that has received a data reference instruction from the application server 20, at step S501, the chief access unit 13 issues (and generates within the memory device 103) issuance data 150 (FIG. 9) for a transaction (current transaction) where the reference operation is performed. Note that a value indicative of activation of the reference operation may be registered in the issuance time type of the generated issuance data 150. At step S502, the chief access unit 13 requests the respective access units 13 of the other nodes to issue issuance data 150 corresponding to the reference operation. At step S503, in response to this request, the access units 13 of the other nodes issue the issuance data 150 and register issuance data storage areas in the respective nodes. At step S504, the respective access units 13 of the other nodes transmit the issued issuance data 150 to the chief access unit 13. At step S505, the chief access unit 13 receives the issuance data 150 from the other nodes. In this manner, the chief access unit 13 can obtain the respective issuance data 150 of the other nodes.

At step S506, the chief node starts to refer to target data (hereinafter referred to as "reference data"). At step S507, the chief node makes the same determination operations as steps S303-S308 enclosed in dashed lines P1 in FIG. 12 on a target record to be referred to. If the reference data belongs to only the chief node (NO: S508), the chief access unit 13 refers to the target record at step S509. On the other hand, if the reference data belongs to the other nodes (assistant nodes) and the reference operation must be derived or requested to the assistant nodes (YES: S508), the chief access unit 13 derives the reference operation to the assistant access unit 13 at step S510. At step S511, the same operations as the portion enclosed in the dashed lines P1 in FIG. 12 are performed in the assistant node for the determination operations on the target record to be referred to. At step S512, the assistant access unit 13 refers to the target record to be referred to.

After steps S509 and S512, at step S513, the chief access unit 13 completes the reference operation. At step S514, the chief access unit 13 deletes the issuance data 150 generated at step S501. At step S515, the chief access unit 13 requests the access units 13 in the other nodes to delete the issuance data 150. At step S516, the chief access unit 13 performs a termination operation for the ghost transaction in the chief node in accordance with the same processing procedure as the operations S312-S318 enclosed in the dashed lines P2 in FIG. 12.

On the other hand, at step S517, in response to receipt of a deletion request for the issuance data 150, the respective access units 13 in the other nodes delete the issuance data 150 issued in the respective nodes at step S503. At step S518, the other nodes perform the termination operation for the ghost transactions in the other nodes in accordance with the same processing procedure as the operations S312-S318 enclosed in the dashed lines P2 in FIG. 12.

Figure 21:
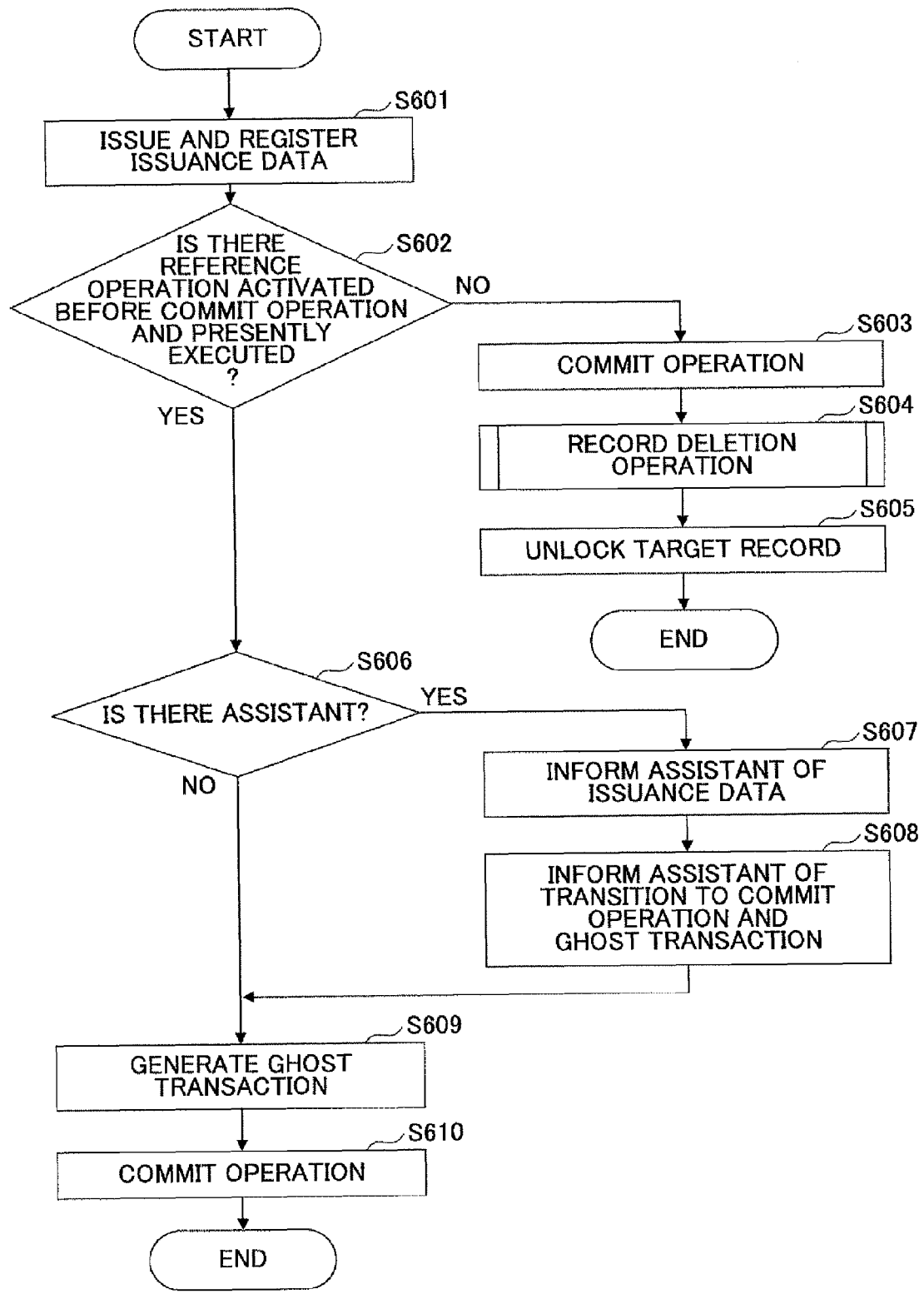
FIG. 21 is a flowchart illustrating an exemplary processing procedure of a commit operation according to the second embodiment.

FIG. 21 is a flowchart illustrating a processing procedure of a commit operation according to the second embodiment. FIG. 21 corresponds to FIG. 8 according to the first embodiment.

At steps S601-S603, the same operations as steps S201-S203 in FIG. 8 are performed in the chief node. At step S604, the chief node performs a record deletion operation in the same processing procedure as the operations (S204-S208) enclosed in dashed lines P3 in FIG. 8. At step S605, the lock control unit 14 in the chief node unlocks (releases locking) a record locked in a target transaction to be committed (current transaction).

If there is a concurrent reference operation (YES: S602) and the current transaction is requested for an assistant node (YES: S606), the chief access unit 13 transmits the issuance data 150 issued at step S601 to the assistant node and informs the assistant node that a commit operation is performed and the current transaction is transitioned to a ghost transaction at steps S607-S608.

On the other hand, if there is a concurrent reference operation (YES: S602) and the current transaction is not requested for an assistant node (NO: S606), after step S608, the chief node generates a ghost transaction and performs a commit operation for the current transaction at steps S609-S610 in accordance with the same processing procedure as steps S210-S211 in FIG. 8.

According to the second embodiment, as mentioned above, even if a node has a system time different from the other nodes, the node can properly comprehend the chronological relationship between an update operation requested by the other nodes and a reference operation of the node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:
1. A computer readable storage medium for storing a data management program causing a computer to execute a processing method, the processing method comprising:
   a reference activation step, after generating a first time-series data in a memory device at activation of a reference operation to a first record in a database, of referring to the first record, the first time-series data for causing a chronological relationship to be identifiable;
   an update step, in response to an update request for the first record, of generating a second record corresponding to the first record in the database and updating the second record;
   a commit step of generating a second time-series data in the memory device at a commit operation for the updating;
   a reference termination step of deleting the first time-series data at completion of the reference operation; and a deletion step, if the first time-series data generated earlier than the second time-series data is not present as a result of the commit step or the reference termination step, of deleting the first record.

2. The computer readable storage medium as claimed in claim 1, wherein
the first and the second time-series data are associated with an identifier of the record to be referred to or updated, and
the deletion step comprises deleting the first record if the first time-series data, generated earlier than the second time-series data and associated with the same identifier of the record as the second time-series data, is not present.

3. The computer readable storage medium as claimed in claim 1, wherein
the update step comprises locking the first record and the second record, and
the processing step further comprises:
an occupation information storage step, in response to the commit step, of storing occupation information indicative of a content of the lock in the memory device if the first time-series data generated earlier than the second time-series data is present;
a lock control step of controlling lock of the database based on the occupation information stored in the memory device; and
an occupation information deletion step of deleting the occupation information if the first time-series data generated earlier than the second time-series data is not present as a result of the reference termination step.

4. The computer readable storage medium as claimed in claim 1, wherein the processing method further comprises a reference step of causing the first record to be referred to in a reference operation associated with the first time-series data generated earlier than the second time-series data and the second record to be referred to in a reference operation associated with the first time-series data generated later than the second time-series data.

5. The computer readable storage medium as claimed in claim 1, wherein
the first and the second time-series data are associated with a node identifier for identifying nodes in a multiple node environment, and
the reference activation step comprises requesting another node to generate the first time-series data and obtaining the first time-series data generated in the another node in response to the request, and
the update step comprises,
another node commit step, in response to an update request from the another node, of generating a second record corresponding to the first record in the database and updating the second record, and in response to a commit operation for the updating in the other node, of obtaining the second time-series data generated in the other node; and
a second deletion step of deleting the first record if the first time-series data generated earlier than the second time-series data obtained by the other node and obtained from the other node is not present.

6. A data management method, comprising:
a reference activation step, after generating a first time-series data in a memory device at activation of a reference operation to a first record in a database, of referring to the first record, the first time-series data for causing a chronological relationship to be identifiable;
an update step, in response to an update request for the first record, of generating a second record corresponding to the first record in the database and updating the second record;
a commit step of generating a second time-series data in the memory device at a commit operation for the updating;
a reference termination step of deleting the first time-series data at completion of the reference operation; and
a deletion step, if the first time-series data generated earlier than the second time-series data is not present as a result of the commit step or the reference termination step, of deleting the first record.

7. The method as claimed in claim 6, wherein
the first and the second time-series data are associated with an identifier of the record to be referred to or updated, and
the deletion step comprises deleting the first record if the first time-series data, generated earlier than the second time-series data and associated with the same identifier of the record as the second time-series data, is not present.

8. The method as claimed in claim 6, wherein
the update step comprises locking the first record and the second record, and
the method further comprises:
an occupation information storage step, in response to the commit step, of storing occupation information indicative of a content of the lock in the memory device if the first time-series data generated earlier than the second time-series data is present;
a lock control step of controlling lock of the database based on the occupation information stored in the memory device; and
an occupation information deletion step of deleting the occupation information if the first time-series data generated earlier than the second time-series data is not present as a result of the reference termination step.

9. The method as claimed in claim 6, further comprising a reference step of causing the first record to be referred to in a reference operation associated with the first time-series data generated earlier than the second time-series data and the second record to be referred to in a reference operation associated with the first time-series data generated later than the second time-series data.

10. The method as claimed in claim 6, wherein
the first and the second time-series data are associated with a node identifier for identifying nodes in a multiple node environment, and
the reference activation step comprises requesting another node to generate the first time-series data and obtaining the first time-series data generated in the another node in response to the request, and
the update step comprises,
another node commit step, in response to an update request from the another node, of generating a second record corresponding to the first record in the database and updating the second record, and in response to a commit operation for the updating in the other node, of obtaining the second time-series data generated in the other node; and
a second deletion step of deleting the first record if the first time-series data generated earlier than the second time-series data obtained by the other node and obtained from the other node is not present.

11. A data management apparatus, comprising:
a CPU and a memory device;

a reference activation unit configured to, after generating a first time-series data in the memory device at activation of a reference operation to a first record in a database, refer to the first record, the first time-series data for causing a chronological relationship to be identifiable;

an update unit configured to, in response to an update request for the first record, generate a second record corresponding to the first record in the database and update the second record;

a commit unit configured to generate a second time-series data in the memory device at a commit operation for the updating;

a reference termination unit configured to delete the first time-series data at completion of the reference operation; and a deletion unit configured to, if the first time-series data generated earlier than the second time-series data is not present as a result of the commit unit or the reference termination unit, delete the first record.

12. The apparatus as claimed in claim 11, wherein
the first and the second time-series data are associated with an identifier of the record to be referred to or updated, and
the deletion unit is configured to delete the first record if the first time-series data, generated earlier than the second time-series data and associated with the same identifier of the record as the second time-series data, is not present.

13. The apparatus as claimed in claim 11, wherein
the update unit is configured to lock the first record and the second record, and
the apparatus further comprises:
an occupation information storage unit configured to, in response to the commit unit, store occupation information indicative of a content of the lock in the memory device if the first time-series data generated earlier than the second time-series data is present;
a lock control unit configured to control lock of the database based on the occupation information stored in the memory device; and
an occupation information deletion unit configured to delete the occupation information if the first time-series data generated earlier than the second time-series data is not present as a result of the reference termination unit.

14. The apparatus as claimed in claim 11, further comprising a reference unit configured to cause the first record to be referred to in a reference operation associated with the first time-series data generated earlier than the second time-series data and the second record to be referred to in a reference operation associated with the first time-series data generated later than the second time-series data.

15. The apparatus as claimed in claim 11, wherein
the first and the second time-series data are associated with a node identifier for identifying nodes in a multiple node environment, and
the reference activation unit is configured to request another node to generate the first time-series data and obtain the first time-series data generated in the another node in response to the request, and
the update unit comprises,
another node commit unit configured to, in response to an update request from the another node, generate a second record corresponding to the first record in the database and update the second record, and in response to a commit operation for the updating in the other node, obtain the second time-series data generated in the other node; and
a second deletion unit configured to delete the first record if the first time-series data generated earlier than the second time-series data obtained by the other node and obtained from the other node is not present.

* * * * *